US012560789B2

(12) United States Patent
Chen et al.

(10) Patent No.: US 12,560,789 B2
(45) Date of Patent: Feb. 24, 2026

(54) OPTICAL LENS ASSEMBLY AND ELECTRONIC DEVICE

(71) Applicant: NEWMAX TECHNOLOGY CO., LTD., Taichung (TW)

(72) Inventors: Ping-Yi Chen, Taichung (TW); Fei-Hsin Tsai, Taichung (TW); Cong Ge, Guangdong Province (CN)

( * ) Notice: Subject to any disclaimer, the term of this patent is extended or adjusted under 35 U.S.C. 154(b) by 301 days.

(21) Appl. No.: 18/465,987

(22) Filed: Sep. 13, 2023

(65) Prior Publication Data

US 2025/0013025 A1 Jan. 9, 2025

(30) Foreign Application Priority Data

Jul. 4, 2023 (TW) .................................. 112124850

(51) Int. Cl.
| | |
|---|---|
| *G02B 17/08* | (2006.01) |
| *G02B 9/12* | (2006.01) |
| *G02B 25/00* | (2006.01) |

(52) U.S. Cl.
CPC ........... *G02B 17/0856* (2013.01); *G02B 9/12* (2013.01); *G02B 25/001* (2013.01)

(58) Field of Classification Search
CPC .. G02B 27/0172; G02B 5/3083; G02B 27/28; G02B 27/286; G02B 13/0035; G02B 17/0856; G02B 27/0101; G02B 5/30; G02B 5/3025; G02F 1/133528; G02F 1/133638; G02F 1/133536; G02F 2413/08; G02F 1/0136; G02F 2203/09; B32B 2307/42
See application file for complete search history.

(56) References Cited

FOREIGN PATENT DOCUMENTS

CN 21732284 * 11/2022 ........... G02B 13/003

* cited by examiner

*Primary Examiner* — Brandi N Thomas
(74) *Attorney, Agent, or Firm* — Bruce Stone LLP; Joseph A. Bruce

(57) ABSTRACT

An optical lens assembly includes, in order from a visual side to an image source side: an optical group including a partial-reflective-partial-transmissive element; and in order from the visual side to the image source side: an absorptive polarizer, a reflective polarizer, a phase retarder, a first lens, a second lens, and a third lens; wherein the partial-reflective-partial-transmissive element is disposed between the first lens and the third lens; at least one of the first lens and the second lens has a positive refractive power; when the focus of the optical lens assembly changes from a near point to a far point, the optical group moves from the image source side to the visual side. The optical lens assembly may become lightweight and have good image quality when satisfying a specific condition.

14 Claims, 18 Drawing Sheets

OPTICAL LENS ASSEMBLY AND ELECTRONIC DEVICE

BACKGROUND

Field of the Invention

The present invention relates to an optical lens assembly and electronic device, and more particularly to an optical lens assembly applicable to electronic devices.

Description of Related Art

With the development of the semiconductor industry, the functions of various consumer electronic products are increasingly powerful. Moreover, various services of the software application end emerge. These enable consumers to have more choices. Virtual reality (VR) technology, Augmented reality (AR) technology and Mixed reality (MR) technology emerge when the market is no longer satisfied with handheld electronic products. Nowadays, the application of virtual reality opens up a blue ocean market for consumer electronics, and in the application field of virtual reality, the first commercialized project is the head-mounted display. However, the current head-mounted displays are heavy and have poor image quality.

In addition, the existing head-mounted displays are mostly focal design, so users with myopia or farsightedness need to wear their inherent glasses. This will affect the comfort of the wearing and the performance of the head-mounted display.

The present invention mitigates and/or obviates the aforementioned disadvantages.

SUMMARY

The objective of the present invention is to provide an optical lens assembly and an electronic device, which can reduce the weight of the device by folding the light path, so as to provide a zoom function, allowing the user to use the device without wearing additional glasses, and ensure the image quality.

Therefore, an optical lens assembly in accordance with an embodiment of the present invention includes, in order from a visual side to an image source side: an optical group including a partial-reflective-partial-transmissive element; and in order from the visual side to the image source side: an absorptive polarizer (that is, a first absorptive polarizer), a reflective polarizer, a phase retarder (that is, a first phase retarder), a first lens with refractive power, and a second lens with refractive power; and a third lens with refractive power; wherein the partial-reflective-partial-transmissive element is disposed between the first lens and the third lens; at least one of the first lens and the second lens has a positive refractive power; when the focus of the optical lens assembly changes from a near point to a far point, the optical group moves from the image source side to the visual side.

In the optical lens assembly, a focal length of the optical lens assembly focusing on the near point is f_N, a focal length of the optical lens assembly focusing on the far point is f_F, a focal length of the first lens and the second lens combined is f12, a focal length of the first lens is f1, a focal length of the second lens is f2, a focal length of the third lens is f3, a radius of curvature of an image source-side surface of the first lens is R2, a radius of curvature of a visual-side surface of the second lens is R3, a radius of curvature of an image source-side surface of the second lens is R4, a radius of curvature of a visual-side surface of the third lens is R5, a radius of curvature of an image source-side surface of the third lens is R6, a thickness of the first lens along an optical axis is CT1, a thickness of the second lens along the optical axis is CT2, a thickness of the third lens along the optical axis is CT3, a distance from the image source-side surface of the second lens of the optical group to the visual-side surface of the third lens, along the optical axis when the optical lens assembly focuses on the far point is T23_F, a distance from the image source-side surface of the second lens of the optical group to the visual-side surface of the third lens, along the optical axis when the optical lens assembly focuses on the near point is T23_N, a maximum effective radius of the image source-side surface of the first lens is CA2, a maximum effective radius of the visual-side surface of the second lens is CA3, a maximum effective radius of the visual-side surface of the third lens is CA5, a maximum effective radius of the image source-side surface of the third lens is CA6, an absolute value of a displacement in parallel to the optical axis from an intersection between the image source-side surface of the first lens and the optical axis to the maximum effective radius position on the image source-side surface of the first lens is TDP2, an absolute value of a displacement in parallel to the optical axis from an intersection between the visual-side surface of the second lens and the optical axis to the maximum effective radius position on the visual-side surface of the second lens is TDP3, an absolute value of a displacement in parallel to the optical axis from an intersection between the visual-side surface of the third lens and the optical axis to the maximum effective radius position on the visual-side surface of the third lens is TDP5, an absolute value of a displacement in parallel to the optical axis from an intersection between the image source-side surface of the third lens and the optical axis to the maximum effective radius position on the image source-side surface of the third lens is TDP6, and at least one of the following condition is satisfied:

$$0.72 < f\_N/f\_F < 1.22;$$

$$-11.34 < R6/R5 < 1.61;$$

$$-0.83 < R6/R2 < 2.46;$$

$$4.83 < CA2/TDP2 < 80.97;$$

$$-171.97 \text{ mm} < (R3*R5)/f2 < 144.98 \text{ mm};$$

$$-10.65 < f2/f3 < 7.35;$$

$$4.06 < CA3/TDP3 < 49.78;$$

$$-3.25 < f1/f2 < 3.77;$$

$$-54.72 < R2/CT1 < 103.11;$$

$$2.40 < CA5/TDP5 < 42.28;$$

$$-39.56 < R3/CT2 < 65.50;$$

$$0.18 < CT1/CT2 < 3.69;$$

$$0.51 < (CT1+CT2)/CT3 < 4.51;$$

$$-13.11 < (T23\_F-T23\_N)/(f\_F-f\_N) < 4.28;$$

$$-120.01 < f12/f3 < 4.43;$$

$$-2.40 \text{ mm} < (f\_N*f\_F)/f12 < 14.49 \text{ mm};$$

$-9.39 < R3/R4 < 3.15$; and $2.23 < CA6/TDP6 < 2007.81$.

When $0.72 < f\_N/f\_F < 1.22$ is satisfied, the optical lens assembly can satisfy the needs of most of myopic human eyes within this zoom range.

When $-11.34 < R6/R5 < 1.61$ is satisfied, it is conducive to preventing the radius of curvature from being too small and reducing the sensitivity to the assembly tolerance as the two radii of curvature are conditioned by each other.

When $-0.83 < R6/R2 < 2.46$ is satisfied, it is conducive to preventing the radius of curvature from being too small and reducing the sensitivity to the assembly tolerance as the two radii of curvature are conditioned by each other.

When $4.83 < CA2/TDP2 < 80.97$ is satisfied, it is conducive to achieving a proper balance between the formability of the first lens and the image quality of the optical lens assembly.

When $-171.97$ mm $< (R3*R5)/f2 < 144.98$ mm is satisfied, it is conducive to achieving the more appropriate distribution of the radius of curvature of the second lens, thereby reducing the chromatic aberration.

When $-10.65 < f2/f3 < 7.35$ is satisfied, it is conducive to achieving the more appropriate distribution of the radius of curvature of the optical lens assembly, thereby reducing the aberration.

When $4.06 < CA3/TDP3 < 49.78$ is satisfied, it is conducive to achieving a proper balance between the formability of the second lens and the image quality of the optical lens assembly.

When $-3.25 < f1/f2 < 3.77$ is satisfied, it is conducive to achieving the more appropriate distribution of the radius of curvature of the optical lens assembly, thereby reducing the aberration.

When $-54.72 < R2/CT1 < 103.11$ is satisfied, it is conducive to improving the distortion of the optical lens assembly, reducing the aberration of the optical lens assembly, and further reducing the size of the lens.

When $2.40 < CA5/TDP5 < 42.28$ is satisfied, it is conducive to achieving a proper balance between the formability of the second lens and the image quality of the optical lens assembly.

When $-39.56 < R3/CT2 < 65.50$ is satisfied, it is conducive to achieving a proper balance between the radius of curvature and the thickness of the second lens.

When $0.18 < CT1/CT2 < 3.69$ is satisfied, it is conducive to the thickness cooperation of the first lens with the second lens to ensure the assembly stability.

When $0.51 < (CT1+CT2)/CT3 < 4.51$ is satisfied, it is conducive to ensuring that the thickness of the optical lens assembly can meet the processing requirement of the manufacturing process of the optical lens assembly, while ensuring the image quality.

When $-13.11 < (T23\_F-T23\_N)/(f\_F-f\_N) < 4.28$ is satisfied, it ensures the balance of the performance and the miniaturization of the optical lens assembly optimal within the zoom range.

When $-120.01 < f12/f3 < 4.43$ is satisfied, it is conducive to achieving the more appropriate distribution of the radius of curvature of the optical lens assembly, thereby reducing the aberration.

When $-2.40$ mm $< (f\_N*f\_F)/f12 < 14.49$ mm is satisfied, the difference of the optical distortion from the near point to the far point can be reduced.

When $-9.39 < R3/R4 < 3.15$ is satisfied, it is conducive to preventing the radius of curvature from being too small and reducing the sensitivity to the assembly tolerance as the two radii of curvature are conditioned by each other.

When $2.23 < CA6/TDP6 < 2007.81$ is satisfied, it is conducive to achieving a proper balance between the formability of the first lens and the image quality of the optical lens assembly.

Moreover, a head-mounted electronic device in accordance with an embodiment of the present invention includes a housing, the aforementioned optical lens assembly disposed in the housing, an image source disposed on the image source plane of the optical lens assembly in the housing, and a controller disposed in the housing and electrically connected to the image source.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
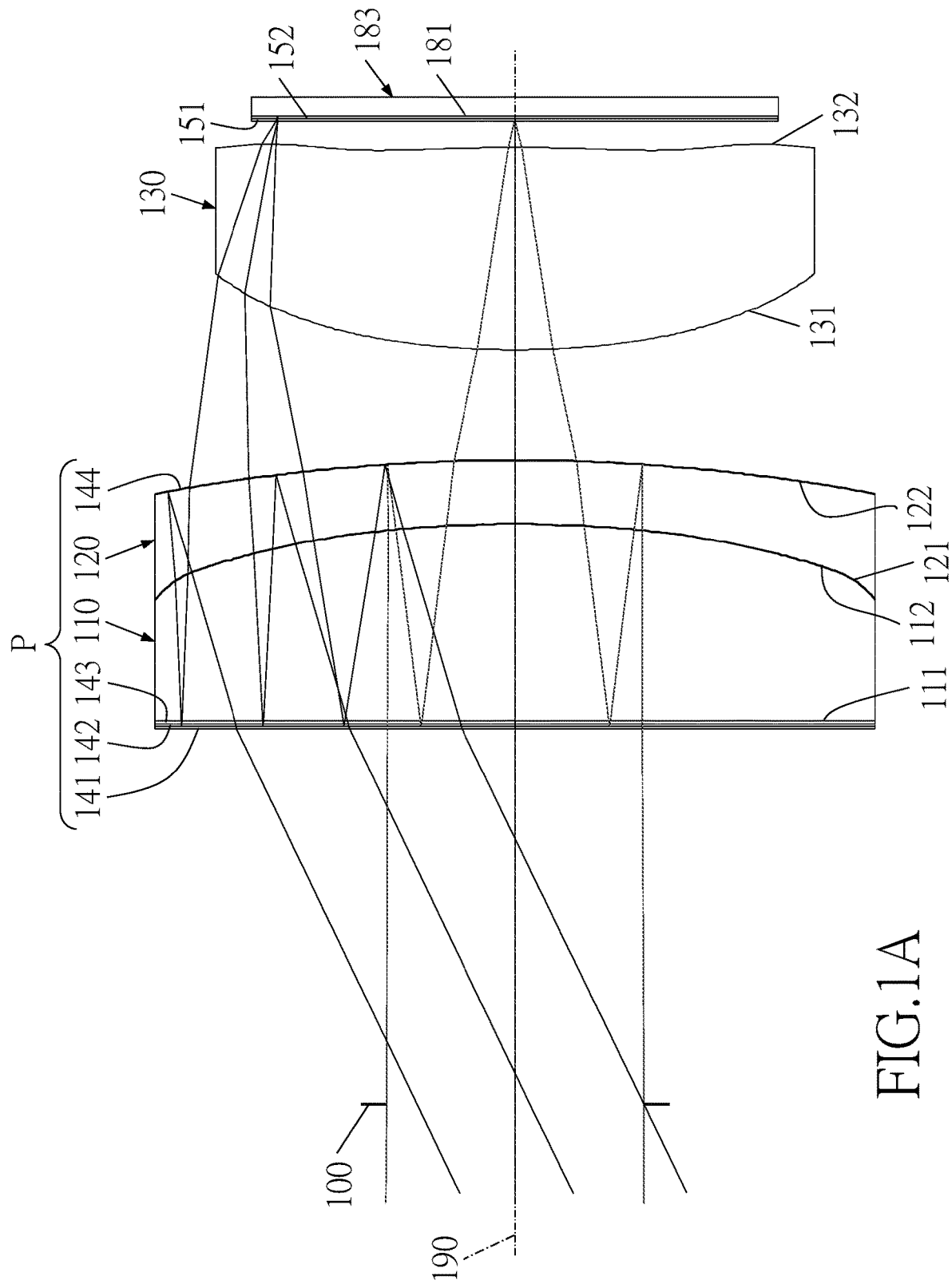
FIG. 1A is a schematic diagram of an optical lens assembly focusing on a far point in accordance with a first embodiment of the present invention.
Figure 1B:
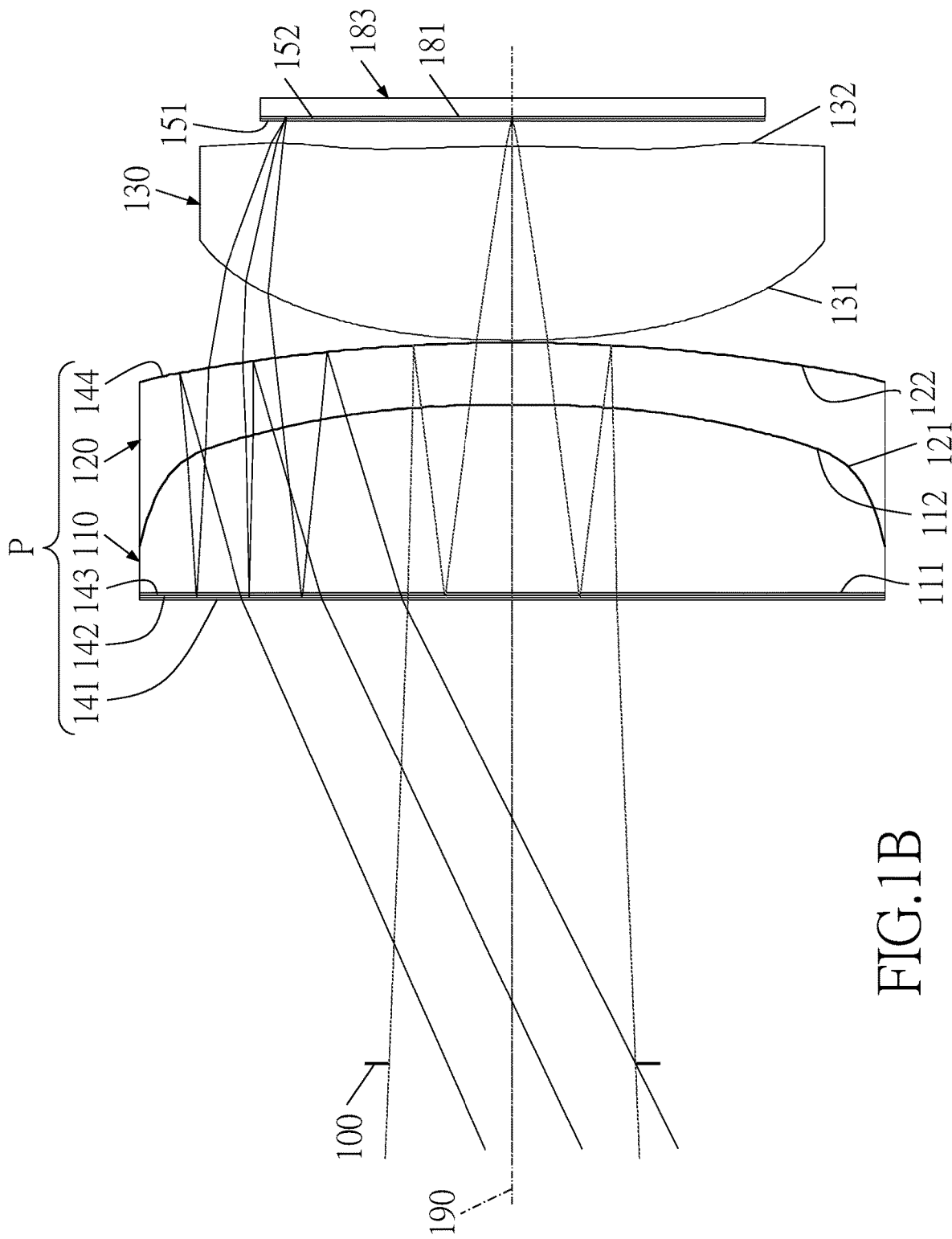
FIG. 1B is a schematic diagram of the optical lens assembly focusing on a near point in accordance with the first embodiment of the present invention.
Figure 1C:
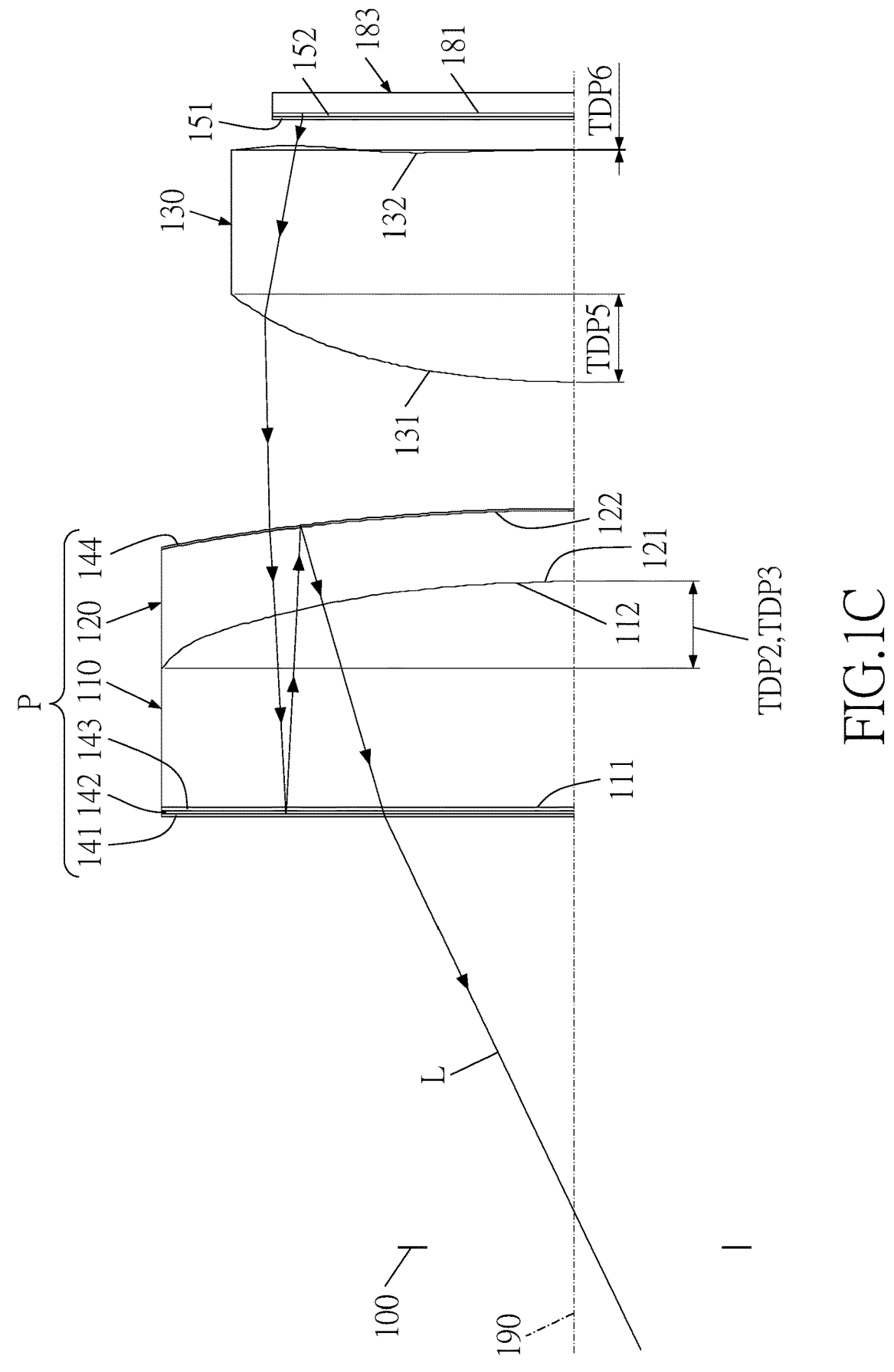
FIG. 1C is a schematic diagram of parameters and light path of the optical lens assembly in accordance with the first embodiment of the present invention.

Referring to FIGS. 1A to 1C, an optical lens assembly in accordance with a first embodiment of the present invention includes, in order from a visual side to an image source side along an optical axis 190: a stop 100, a first absorptive polarizer 141, a reflective polarizer 142, a first phase retarder 143, a first lens 110, a second lens 120, a partial-reflective-partial-transmissive element 144, a third lens 130, a second phase retarder 151, a second absorptive polarizer 152 and an image source plane 181. Wherein the first absorptive polarizer 141, the reflective polarizer 142, the first phase retarder 143, the first lens 110, the second lens 120 and the partial-reflective-partial-transmissive element 144 form an optical group P. When the focus of the optical lens assembly changes from a near point (FIG. 1B) to a far point (FIG. 1A), the optical group P moves from the image source side to the visual side. The optical lens assembly has a total of three lenses with refractive power, but not is limited thereto.

The stop 100 may be located in a position where the user's eyes view an image.

The first lens 110 with positive refractive power includes a visual-side surface 111 and an image source-side surface 112, the visual-side surface 111 of the first lens 110 is flat in a paraxial region thereof, the image source-side surface 112 of the first lens 110 is convex in a paraxial region thereof, the image source-side surface 112 of the first lens 110 is aspheric, and the first lens 110 is made of plastic.

The second lens 120 with negative refractive power includes a visual-side surface 121 and an image source-side surface 122, the visual-side surface 121 of the second lens 120 is concave in a paraxial region thereof, the image source-side surface 122 of the second lens 120 is convex in a paraxial region thereof, the visual-side surface 121 and the image source-side surface 122 of the second lens 120 are aspheric, and the second lens 120 is made of plastic. The second lens 120 and the first lens 110 together form a cemented doublet lens.

The third lens 130 with positive refractive power includes a visual-side surface 131 and an image source-side surface 132, the visual-side surface 131 of the third lens 130 is convex in a paraxial region thereof, the image source-side surface 132 of the third lens 130 is convex in a paraxial region thereof, the visual-side surface 131 and the image source-side surface 132 of the third lens 130 are aspheric, and the third lens 130 is made of plastic.

The first phase retarder 143 is disposed on the visual-side surface 111 of the first lens 110, and is, for example, but not limited to, a quarter-wave plate.

The reflective polarizer 142 is disposed on the first phase retarder 143.

The first absorptive polarizer 141 is disposed on the reflective polarizer 142.

The partial-reflective-partial-transmissive element 144 is disposed on (for example, but not limited to, coating) the image source-side surface 122 of the second lens 120 and has an average reflectance of at least 30%, preferably 50%, in the wavelength range of visible light. The average reflectance here is an average value of different reflectance of the partial-reflective-partial-transmissive element 144 for different wavelengths. The partial-reflective-partial-transmissive element 144 is disposed between the first lens 110 and the third lens 130.

The second absorptive polarizer 152 is disposed on the image source plane 181.

The second phase retarder 151 is disposed on the second absorptive polarizer 152, and is, for example, but not limited to, a quarter-wave plate.

The optical lens assembly works in cooperation with an image source 183 disposed on the image source plane 181. In the present embodiment, the type of the image source 183 is, for example, but not limited to, an OLED display, a LED display, a liquid crystal display, or other displays.

The curve equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot \left(h^i\right)$$

wherein:

z represents the value of a reference position at a height of h with respect to a vertex of the surface of a lens along the optical axis 190;

c represents a paraxial curvature (i.e., a curvature of a lens surface in a paraxial region thereof) equal to 1/R (R: a paraxial radius of curvature);

h represents a vertical distance from the point on the curve of the aspheric surface to the optical axis 190;

k represents the conic constant; and

Ai represents the i-th order aspheric coefficient.

The optical lens assembly of the first embodiment utilizes the configuration and arrangement of the absorptive polarizer, the reflective polarizer, the phase retarders, the partial-reflective-partial-transmissive element and the lenses to fold the light path thereof by the transmission and reflection of light to shorten the length of the optical lens assembly required for forming an image without affecting the image quality. In a light path L in FIG. 1C, an unpolarized beam from the image source 183 turns to a linearly-polarized beam after passing through the second absorptive polarizer 152. This linearly-polarized beam turns to a circularly-polarized beam after passing through the second phase retarder 151. When the circularly-polarized beam passes through the third lens 130 and transmits to the partial-reflective-partial-transmissive element 144, a component of the circularly-polarized beam passes through the partial-reflective-partial-transmissive element 144, and then passes through the second lens 120, the first lens 110 and the first phase retarder 143 sequentially to turn to a linearly-polarized beam with a polarization direction parallel to the reflective axis of the reflective polarizer 142 and transmit to the reflective polarizer 142. This linearly-polarized beam is reflected by the reflective polarizer 142 and passes through the first phase retarder 143 again to turn to a circularly-polarized beam, and then passes through the first lens 110 and the second lens 120 to transmit to partial-reflective-partial-transmissive element 144. Then, a component of the circularly-polarized beam is reflected by the partial-reflective-partial-transmissive element 144, and then passes through the second lens 120, the first lens 110 and the first phase retarder 143 sequentially to turn to a linearly-polarized beam with a polarization direction vertical to the reflective axis of the reflective polarizer 142. Finally, the linearly-polarized beam transmits to the user's eyes after passing through the reflective polarizer 142 and the first absorptive polarizer 141 sequentially.

Please refer to Tables 1-4, Table 1 shows the detailed optical data of the elements of the optical lens assembly of the first embodiment, Table 2 shows the aspheric coefficients of the aspherical surfaces of the elements of the optical lens assembly of the first embodiment, Table 3 shows the remaining parameters of the optical lens assembly of the first embodiment and the values thereof, and the values of the parameters in Tables 1 and 3 meet the conditional formulas of
Table 4.

A focal length of the optical lens assembly focusing on the near point is f_N, a focal length of the optical lens assembly focusing on the far point is f_F, a focal length of the first lens 110 and the second lens 120 combined is f12, a focal length of the first lens 110 is f1, a focal length of the second lens 120 is f2, a focal length of the third lens 130 is f3, a maximum field of view of the optical lens assembly focusing on the near point is FOV_N, a maximum field of view of the optical lens assembly focusing on the far point is FOV_F, an entrance pupil diameter of the optical lens assembly is EPD, a radius of curvature of the image source-side surface 112 of the first lens 110 is R2, a radius of curvature of the visual-side surface 121 of the second lens 120 is R3, a radius of curvature of the image source-side surface 122 of the second lens 120 is R4, a radius of curvature of the visual-side surface 131 of the third lens 130 is R5, a radius of curvature of the image source-side surface 132 of the third lens 130 is R6, a thickness of the first lens 110 along the optical axis 190 is CT1, a thickness of the second lens 120 along the optical axis 190 is CT2, a thickness of the third lens 130 along the optical axis 190 is CT3, a distance from the image source-side surface 122 of the second lens 120 of the optical group P to the visual-side surface 131 of the third lens 130, along the optical axis 190 when the optical lens assembly focuses on the far point is T23_F, a distance from the image source-side surface 122 of the second lens 120 of the optical group P to the visual-side surface 131 of the third lens 130, along the optical axis 190 when the optical lens assembly focuses on the near point is T23_N, a maximum effective radius of the image source-side surface 112 of the first lens 110 is CA2, a maximum effective radius of the visual-side surface 121 of the second lens 120 is CA3, a maximum effective radius of the visual-side surface 131 of the third lens 130 is CA5, a maximum effective radius of the image source-side surface 132 of the third lens 130 is CA6, an absolute value of a displacement in parallel to the optical axis 190 from an intersection between the image source-side surface 112 of the first lens 110 and the optical axis 190 to the maximum effective radius position on the image source-side surface 112 of the first lens 110 is TDP2, an absolute value of a displacement in parallel to the optical axis 190 from an intersection between the visual-side surface 121 of the second lens 120 and the optical axis 190 to the maximum effective radius position on the visual-side surface 121 of the second lens 120 is TDP3, an absolute value of a displacement in parallel to the optical axis 190 from an intersection between the visual-side surface 131 of the third lens 130 and the optical axis 190 to the maximum effective radius position on the visual-side surface 131 of the third lens 130 is TDP5, an absolute value of a displacement in parallel to the optical axis 190 from an intersection between the image source-side surface 132 of the third lens 130 and the optical axis 190 to the maximum effective radius position on the image source-side surface 132 of the third lens 130 is TDP6.

TABLE 1

Embodiment 1
Near point: f_N = 19.31 mm, EPD = 10.00 mm, FOV_N = 50.42°
Far point: f_F = 20.90 mm, EPD = 10.00 mm, FOV_F = 52.00°

| Surface | | Radius of curvature | Thickness/gap | | Refractive index (nd) | Abbe number (vd) | Refraction/ reflection |
|---|---|---|---|---|---|---|---|
| 0 | Stop | Infinity | Near point | 18.500 | — | — | — |
| | | | Far point | 14.400 | | | |
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 7.550 | | 1.544 | 55.9 | Refraction |
| 5 | Second lens | −58.557 | 2.458 | | 1.645 | 23.4 | Refraction |
| 6 | Partial-reflective-partial-transmissive element | −77.262 | −2.458 | | mirror | | Reflection |
| 7 | First lens | −58.557 | −7.550 | | 1.544 | 55.9 | Refraction |
| 8 | First phase retarder | Infinity | −0.100 | | 1.533 | 56.0 | Refraction |
| 9 | Reflective polarizer | Infinity | −0.100 | | 1.533 | 56.0 | Refraction |
| 10 | Reflective polarizer | Infinity | 0.100 | | mirror | | Reflection |
| 11 | First phase retarder | Infinity | 0.100 | | 1.533 | 56.0 | Refraction |
| 12 | First lens | Infinity | 7.550 | | 1.544 | 55.900 | Refraction |
| 13 | Second lens | −58.557 | 2.458 | | 1.645 | 23.400 | Refraction |
| 14 | Partial-reflective-partial-transmissive element | −77.262 | Near point | 0.100 | — | — | Refraction |
| | | | Far point | 4.228 | | | |
| 15 | Third lens | 35.455 | 7.770 | | 1.544 | 55.900 | Refraction |
| 16 | | −71.637 | 1.000 | | — | — | Refraction |
| 17 | Second phase retarder | Infinity | 0.100 | | 1.533 | 56.0 | Refraction |
| 18 | Second absorptive polarizer | Infinity | 0.100 | | 1.533 | 56.0 | Refraction |

TABLE 1-continued

| Surface | | Radius of curvature | Thickness/gap | Refractive index (nd) | Abbe number (vd) | Refraction/ reflection |
|---|---|---|---|---|---|---|
| | | Embodiment 1 Near point: f_N = 19.31 mm, EPD = 10.00 mm, FOV_N = 50.42° Far point: f_F = 20.90 mm, EPD = 10.00 mm, FOV_F = 52.00° | | | | |
| 19 | Image source plane | Infinity | — | — | — | — |

The reference wavelength is 555 nm.

TABLE 2

Embodiment 1
Aspheric Coefficients

| Surface | A visual-side surface of the first lens 4, 8, 12 | An image source-side surface of the first lens 5, 7, 13 | A visual-side surface of the second lens 5, 7, 13 | An image source-side surface of the second lens 6, 14 | A visual-side surface of the third lens 15 | An image source-side surface of the third lens 16 |
|---|---|---|---|---|---|---|
| K: | 0.0000E+00 | 8.1702E+00 | 8.1702E+00 | 0.0000E+00 | −1.1887E−01 | 4.8721E+01 |
| A2: | 0.0000E+00 | 0.0000E+00 | 0.0000E+00 | 0.0000E+00 | 0.0000E+00 | 0.0000E+00 |
| A4: | 0.0000E+00 | −2.6439E−05 | −2.6439E−05 | −8.0775E−07 | 4.2344E−05 | 9.1660E−05 |
| A6: | 0.0000E+00 | 8.6683E−08 | 8.6683E−08 | −7.6356E−10 | −1.6655E−07 | 8.2298E−07 |
| A8: | 0.0000E+00 | −2.1182E−10 | −2.1182E−10 | 2.8342E−11 | 5.0809E−09 | 2.6676E−08 |
| A10: | 0.0000E+00 | 2.0365E−12 | 2.0365E−12 | −2.2993E−16 | −3.8291E−11 | −3.3685E−10 |
| A12: | 0.0000E+00 | 1.5174E−14 | 1.5174E−14 | 7.8989E−17 | 8.2688E−14 | −3.0337E−12 |
| A14: | 0.0000E+00 | −6.3874E−18 | −6.3874E−18 | 7.7421E−19 | −5.7152E−17 | 6.8505E−16 |
| A16: | 0.0000E+00 | −7.4334E−19 | −7.4334E−19 | −1.8681E−20 | 1.6121E−18 | 4.8480E−16 |
| A18: | 0.0000E+00 | 0.0000E+00 | 0.0000E+00 | 0.0000E+00 | 0.0000E+00 | 3.7511E−20 |
| A20: | 0.0000E+00 | 0.0000E+00 | 0.0000E+00 | 0.0000E+00 | 0.0000E+00 | −1.6599E−20 |

TABLE 3

Embodiment 1

| f_N [mm] | 19.31 | R4[mm] | −77.26 | CA2 [mm] | 13.23 |
|---|---|---|---|---|---|
| f_F [mm] | 20.90 | R5[mm] | 35.46 | CA3 [mm] | 13.23 |
| f12 [mm] | 149.78 | R6[mm] | −71.64 | CA5 [mm] | 11.64 |
| f1 [mm] | 107.31 | CT1[mm] | 7.55 | CA6 [mm] | 9.84 |
| f2 [mm] | −395.87 | CT2[mm] | 2.46 | TDP2 [mm] | 2.19 |
| f3 [mm] | 44.61 | CT3[mm] | 7.77 | TDP3 [mm] | 2.19 |
| R2 [mm] | −58.56 | T23_N[mm] | 0.10 | TDP5 [mm] | 2.93 |
| R3 [mm] | −58.56 | T23_F[mm] | 4.23 | TDP6 [mm] | 0.13 |

TABLE 4

Embodiment 1

| f_N/f_F | 0.92 | R6/R2 | 1.22 |
|---|---|---|---|
| f12/f3 | 3.36 | R3/CT2 | −23.83 |
| R3*R5/f2[mm] | 5.24 | CT1/CT2 | 3.07 |
| f2/f3 | −8.87 | (CT1 + CT2)/CT3 | 1.29 |
| f1/f2 | −0.27 | (T23_F − T23_N)/ (f_F − f_N) | 2.60 |
| (f_N*f_F)/f12[mm] | 2.69 | CA2/TDP2 | 6.04 |
| R2/CT1 | −7.76 | CA3/TDP3 | 6.04 |
| R3/R4 | 0.76 | CA5/TDP5 | 3.97 |
| R6/R5 | −2.02 | CA6/TDP6 | 77.04 |

In Table 1, the units of the radius of curvature, the thickness, the gap and the focal length are expressed in mm, and the surface numbers 19-0 respectively represent the surfaces to which the light sequentially transmits from the image source plane 181 to the stop 100 along the light path L, wherein the surface 0 represents a gap between the stop 100 (or the user's eyes) and the first absorptive polarizer 141 along the optical axis 190; the surface 1 represents the thickness of the first absorptive polarizer 141 along the optical axis 190; the surfaces 2, 9 and 10 represent the thickness of the reflective polarizer 142 along the optical axis 190; the surfaces 3, 8 and 11 represent the thickness of the first phase retarder 143 along the optical axis 190; the surfaces 4, 7 and 12 represent the thickness of the first lens 110 along the optical axis 190; the surfaces 5 and 13 represent the thickness of the second lens 120 along the optical axis 190; the surface 6 represents a gap between the image source-side surface 122 of the second lens 120 and the visual-side surface 121 of the second lens 120 along the optical axis 190, this gap corresponds to the thickness of the second lens 120 along the optical axis 190; the surface 14 represents a gap between the second lens 120 and the third lens 130 along the optical axis 190; the surface 15 represents the thickness of the third lens 130 along the optical axis 190; the surface 16 represents a gap between the third lens 130 and the second phase retarder 151 along the optical axis 190; the surface 17 represents the thickness of the second phase retarder 151 along the optical axis 190; the surface 18 represent the thickness of the second absorptive polarizer 152 along the optical axis 190. The gaps and thicknesses having a positive sign in Table 1 denote the transmission direction of light is toward the stop 100, and the gaps and thicknesses having a negative sign in Table 1 denote the transmission direction of light is toward the image source plane 181.

In table 2, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-4 of the first embodiment. However, the definition of each surface number in Table 1 varies with the number of the lenses and the position of the optical elements, and the relevant description of the embodiments may be referred to the definition mode of each surface number in Table 1. Therefore, an explanation in this regard will not be provided again.

Second Embodiment

Figure 2A:
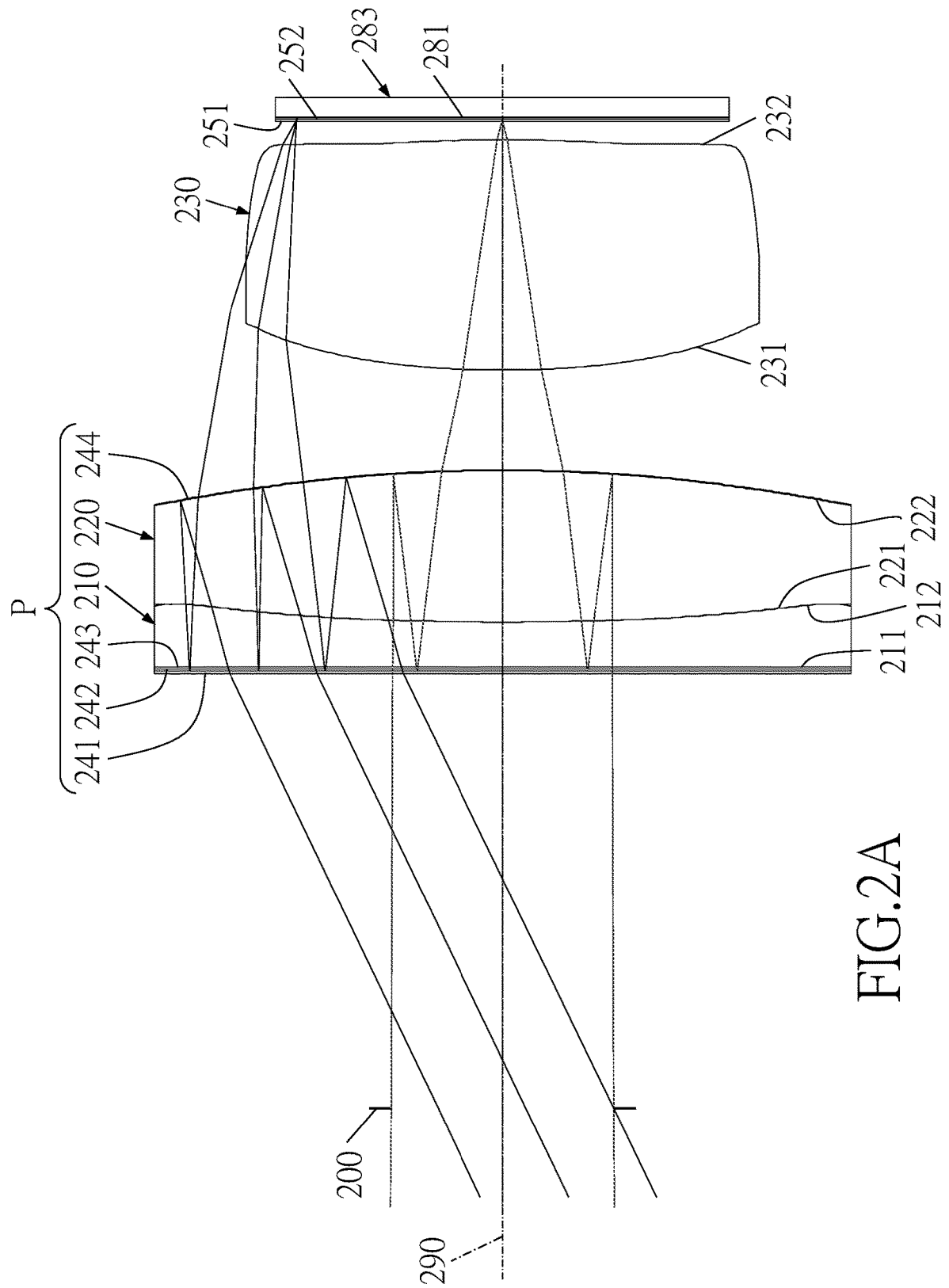
FIG. 2A is a schematic diagram of an optical lens assembly focusing on a far point in accordance with a second embodiment of the present invention.
Figure 2B:
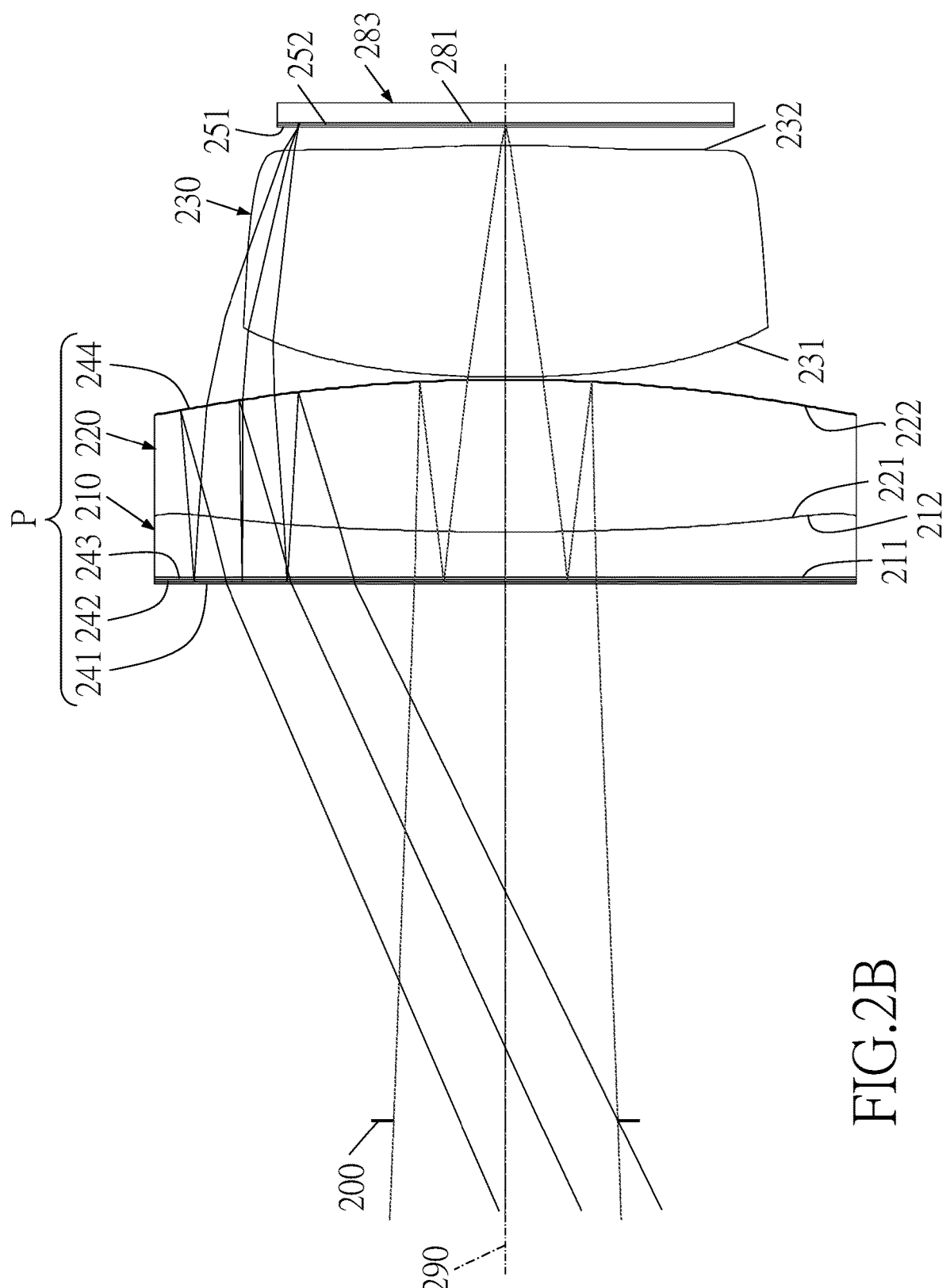
FIG. 2B is a schematic diagram of the optical lens assembly focusing on a near point in accordance with the second embodiment of the present invention.

Referring to FIGS. 2A and 2B, an optical lens assembly in accordance with a second embodiment of the present invention includes, in order from a visual side to an image source side along an optical axis 290: a stop 200, a first absorptive polarizer 241, a reflective polarizer 242, a first phase retarder 243, a first lens 210, a second lens 220, a partial-reflective-partial-transmissive element 244, a third lens 230, a second phase retarder 251, a second absorptive polarizer 252 and an image source plane 281. Wherein the first absorptive polarizer 241, the reflective polarizer 242, the first phase retarder 243, the first lens 210, the second lens 220 and the partial-reflective-partial-transmissive element 244 form an optical group P. When the focus of the optical lens assembly changes from a near point (FIG. 2B) to a far point (FIG. 2A), the optical group P moves from the image source side to the visual side. The optical lens assembly has a total of three lenses with refractive power, but not is limited thereto.

The stop 200 may be located in a position where the user's eyes view an image.

The first lens 210 with negative refractive power includes a visual-side surface 211 and an image source-side surface 212, the visual-side surface 211 of the first lens 210 is flat in a paraxial region thereof, the image source-side surface 212 of the first lens 210 is concave in a paraxial region thereof, the image source-side surface 212 of the first lens 210 is aspheric, and the first lens 210 is made of plastic.

The second lens 220 with positive refractive power includes a visual-side surface 221 and an image source-side surface 222, the visual-side surface 221 of the second lens 220 is convex in a paraxial region thereof, the image source-side surface 222 of the second lens 220 is convex in a paraxial region thereof, the visual-side surface 221 and the image source-side surface 222 of the second lens 220 are aspheric, and the second lens 220 is made of plastic. The second lens 220 and the first lens 210 together form a cemented doublet lens.

The third lens 230 with positive refractive power includes a visual-side surface 231 and an image source-side surface 232, the visual-side surface 231 of the third lens 230 is convex in a paraxial region thereof, the image source-side surface 232 of the third lens 230 is convex in a paraxial region thereof, the visual-side surface 231 and the image source-side surface 232 of the third lens 230 are aspheric, and the third lens 230 is made of plastic.

The configuration modes and characteristics of the first phase retarder 243, the reflective polarizer 242 and the first absorptive polarizer 241 may refer to that of the first phase retarder 143, the reflective polarizer 142 and the first absorptive polarizer 141 of the first embodiment and will not be explained again.

The partial-reflective-partial-transmissive element 244 is disposed on (for example, but not limited to, coating) the image source-side surface 222 of the second lens 220 and has an average reflectance of at least 30%, preferably 50%, in the wavelength range of visible light. The average reflectance here is an average value of different reflectance of the partial-reflective-partial-transmissive element 244 for different wavelengths. The partial-reflective-partial-transmissive element 244 is disposed between the first lens 210 and the third lens 230.

The configuration modes and characteristics of the second absorptive polarizer 252 and the second phase retarder 251 may refer to that of the second absorptive polarizer 152 and the second phase retarder 151 of the first embodiment and will not be explained again.

The optical lens assembly works in cooperation with an image source 283 disposed on the image source plane 281. In the present embodiment, the type of the image source 283 is, for example, but not limited to, an OLED display, a LED display, a liquid crystal display, or other displays.

Please refer to Tables 5-8, Table 5 shows the detailed optical data of the elements of the optical lens assembly of the second embodiment, Table 6 shows the data of the aspherical surfaces of the lenses of the optical lens assembly of the second embodiment, Table 7 shows the remaining parameters of the optical lens assembly of the second embodiment and the values thereof, and the values of the parameters in Tables 5 and 7 meet the conditional formulas of Table 8. In the second embodiment, the equation of the aspheric surface profiles of the aforementioned lenses is the same as the equation of the aspheric surface profiles of the aforementioned lenses in the first embodiment. The definitions of the surfaces in Table 5 can be referred to the relevant description of Table 1 and will not be explained again.

TABLE 5

| Embodiment 2 Near point: $f\_N = 19.93$ mm, EPD = 10.00 mm, FOV_N = 49.22° Far point: $f\_F = 21.18$ mm, EPD = 10.00 mm, FOV_F = 52.00° | | | | | | |
|---|---|---|---|---|---|---|
| Surface | | Radius of curvature | Thickness/gap | Refractive index (nd) | Abbe number (vd) | Refraction/ reflection |
| 0 | Stop | Infinity | Near point 24.000 Far point 19.000 | — | — | — |
| 1 | First absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 2.000 | 1.645 | 23.4 | Refraction |
| 5 | Second lens | 171.849 | 6.706 | 1.544 | 55.9 | Refraction |
| 6 | Partial-reflective-partial-transmissive | −77.238 | −6.706 | mirror | | Reflection |

TABLE 5-continued

Embodiment 2
Near point: f_N = 19.93 mm, EPD = 10.00 mm, FOV_N = 49.22°
Far point: f_F = 21.18 mm, EPD = 10.00 mm, FOV_F = 52.00°

| Surface | | Radius of curvature | Thickness/gap | | Refractive index (nd) | Abbe number (vd) | Refraction/ reflection |
|---|---|---|---|---|---|---|---|
| | element | | | | | | |
| 7 | First lens | 171.849 | −2.000 | | 1.645 | 23.4 | Refraction |
| 8 | First phase retarder | Infinity | −0.100 | | 1.533 | 56.0 | Refraction |
| 9 | Reflective polarizer | Infinity | −0.100 | | 1.533 | 56.0 | Refraction |
| 10 | Reflective polarizer | Infinity | 0.100 | | mirror | | Reflection |
| 11 | First phase retarder | Infinity | 0.100 | | 1.533 | 56.0 | Refraction |
| 12 | First lens | Infinity | 2.000 | | 1.645 | 23.400 | Refraction |
| 13 | Second lens | 171.849 | 6.706 | | 1.544 | 55.900 | Refraction |
| 14 | Partial-reflective-partial-transmissive element | −77.238 | Near point 0.100 Far point 4.452 | | — | — | Refraction |
| 15 | Third lens | 46.266 | 10.198 | | 1.544 | 55.900 | Refraction |
| 16 | | −118.991 | 0.800 | | — | — | Refraction |
| 17 | Second phase retarder | Infinity | 0.100 | | 1.533 | 56.0 | Refraction |
| 18 | Second absorptive polarizer | Infinity | 0.100 | | 1.533 | 56.0 | Refraction |
| 19 | Image source plane | Infinity | — | | — | — | — |

The reference wavelength is 555 nm.

TABLE 6

Embodiment 2
Aspheric Coefficients

| Surface | A visual-side surface of the first lens 4, 8, 12 | An image source-side surface of the first lens 5, 7, 13 | A visual-side surface of the second lens 5, 7, 13 | An image source-side surface of the second lens 6, 14 | A visual-side surface of the third lens 15 | An image source-side surface of the third lens 16 |
|---|---|---|---|---|---|---|
| K: | 0.0000E+00 | 6.5315E+01 | 6.5315E+01 | 0.0000E+00 | 5.6042E+00 | 4.8721E+01 |
| A2: | 0.0000E+00 | 0.0000E+00 | 0.0000E+00 | 0.0000E+00 | 0.0000E+00 | 0.0000E+00 |
| A4: | 0.0000E+00 | 1.6327E−06 | 1.6327E−06 | 1.1316E−06 | 2.3860E−05 | −1.6321E−04 |
| A6: | 0.0000E+00 | 6.0049E−08 | 6.0049E−08 | −7.8547E−09 | −1.4807E−07 | 3.9132E−06 |
| A8: | 0.0000E+00 | −3.6751E−10 | −3.6751E−10 | 4.1968E−11 | 4.0041E−09 | 2.3557E−08 |
| A10: | 0.0000E+00 | 1.2565E−13 | 1.2565E−13 | −4.5472E−14 | −3.2757E−11 | −5.8749E−10 |
| A12: | 0.0000E+00 | 4.6809E−15 | 4.6809E−15 | −3.7035E−16 | 4.4205E−14 | −3.6908E−12 |
| A14: | 0.0000E+00 | −1.7663E−18 | −1.7663E−18 | 7.2640E−19 | 6.3580E−16 | 3.1775E−14 |
| A16: | 0.0000E+00 | −6.4259E−20 | −6.4259E−20 | 2.4063E−21 | −2.0887E−18 | 4.2112E−16 |
| A18: | 0.0000E+00 | 0.0000E+00 | 0.0000E+00 | 0.0000E+00 | 0.0000E+00 | −8.4208E−20 |
| A20: | 0.0000E+00 | 0.0000E+00 | 0.0000E+00 | 0.0000E+00 | 0.0000E+00 | −2.1322E−20 |

TABLE 7

Embodiment 2

| f_N [mm] | 19.93 | R4[mm] | −77.24 | CA2 [mm] | 14.23 |
|---|---|---|---|---|---|
| f_F [mm] | 21.18 | R5[mm] | 46.27 | CA3 [mm] | 14.23 |
| f12 [mm] | 153.62 | R6[mm] | −118.99 | CA5 [mm] | 12.53 |
| f1 [mm] | −266.78 | CT1[mm] | 2.00 | CA6 [mm] | 9.90 |
| f2 [mm] | 98.59 | CT2[mm] | 6.71 | TDP2 [mm] | 0.78 |
| f3 [mm] | 62.41 | CT3[mm] | 10.20 | TDP3 [mm] | 0.78 |
| R2 [mm] | 171.85 | T23_N[mm] | 0.10 | TDP5 [mm] | 2.68 |
| R3 [mm] | 171.85 | T23_F[mm] | 4.45 | TDP6 [mm] | 0.22 |

TABLE 8

Embodiment 2

| f_N/f_F | 0.94 | R6/R2 | −0.69 |
|---|---|---|---|
| f12/f3 | 2.46 | R3/CT2 | 25.63 |
| R3*R5/f2[mm] | 80.64 | CT1/CT2 | 0.30 |
| f2/f3 | 1.58 | (CT1 + CT2)/CT3 | 0.85 |
| f1/f2 | −2.71 | (T23_F − T23_N)/ | 3.47 |

TABLE 8-continued

Embodiment 2

| | | (f_F − f_N) | |
|---|---|---|---|
| (f_N*f_F)/f12[mm] | 2.75 | CA2/TDP2 | 18.14 |
| R2/CT1 | 85.92 | CA3/TDP3 | 18.14 |
| R3/R4 | −2.22 | CA5/TDP5 | 4.67 |
| R6/R5 | −2.57 | CA6/TDP6 | 45.47 |

Third Embodiment

Figure 3A:
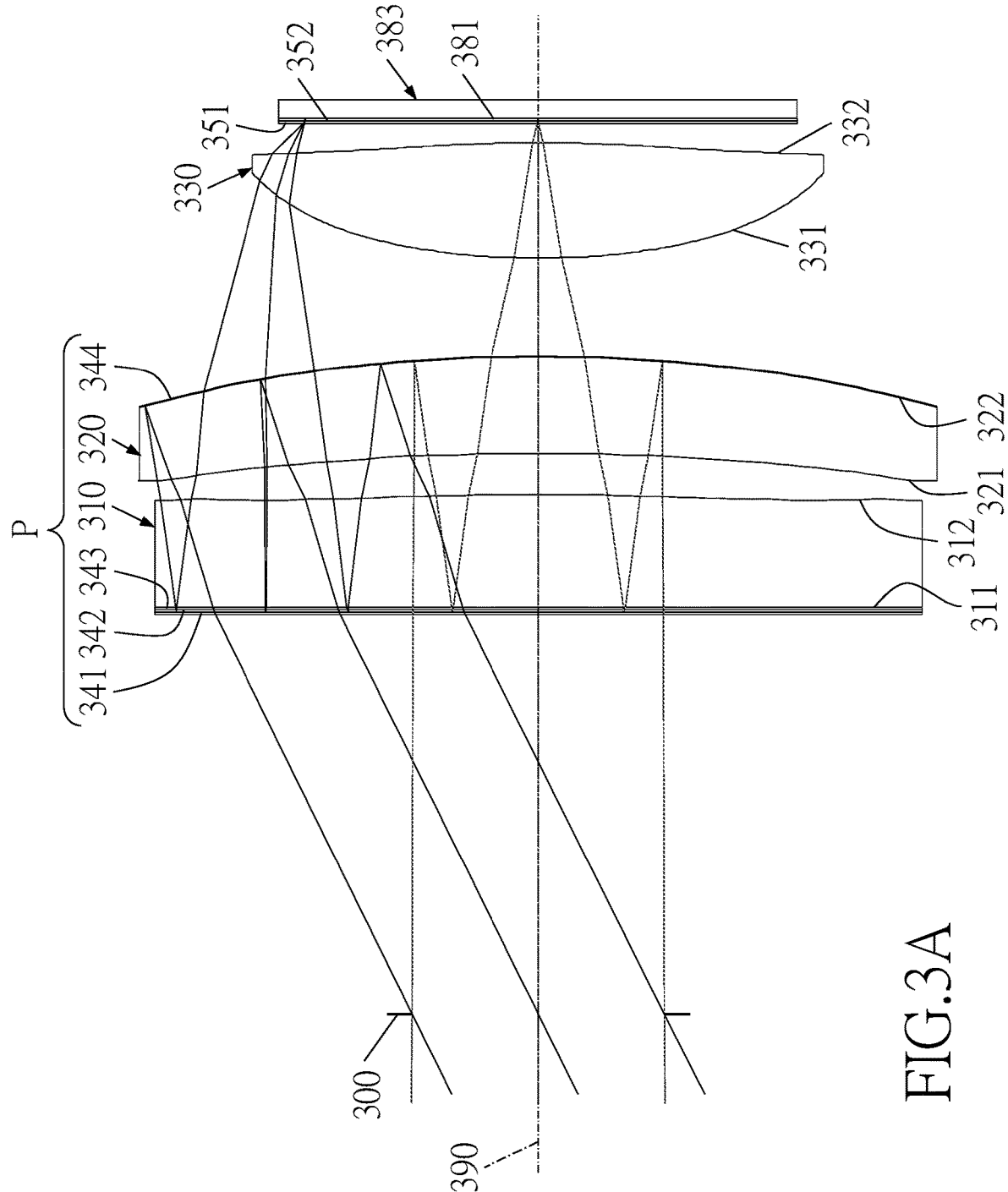
FIG. 3A is a schematic diagram of an optical lens assembly focusing on a far point in accordance with a third embodiment of the present invention.
Figure 3B:
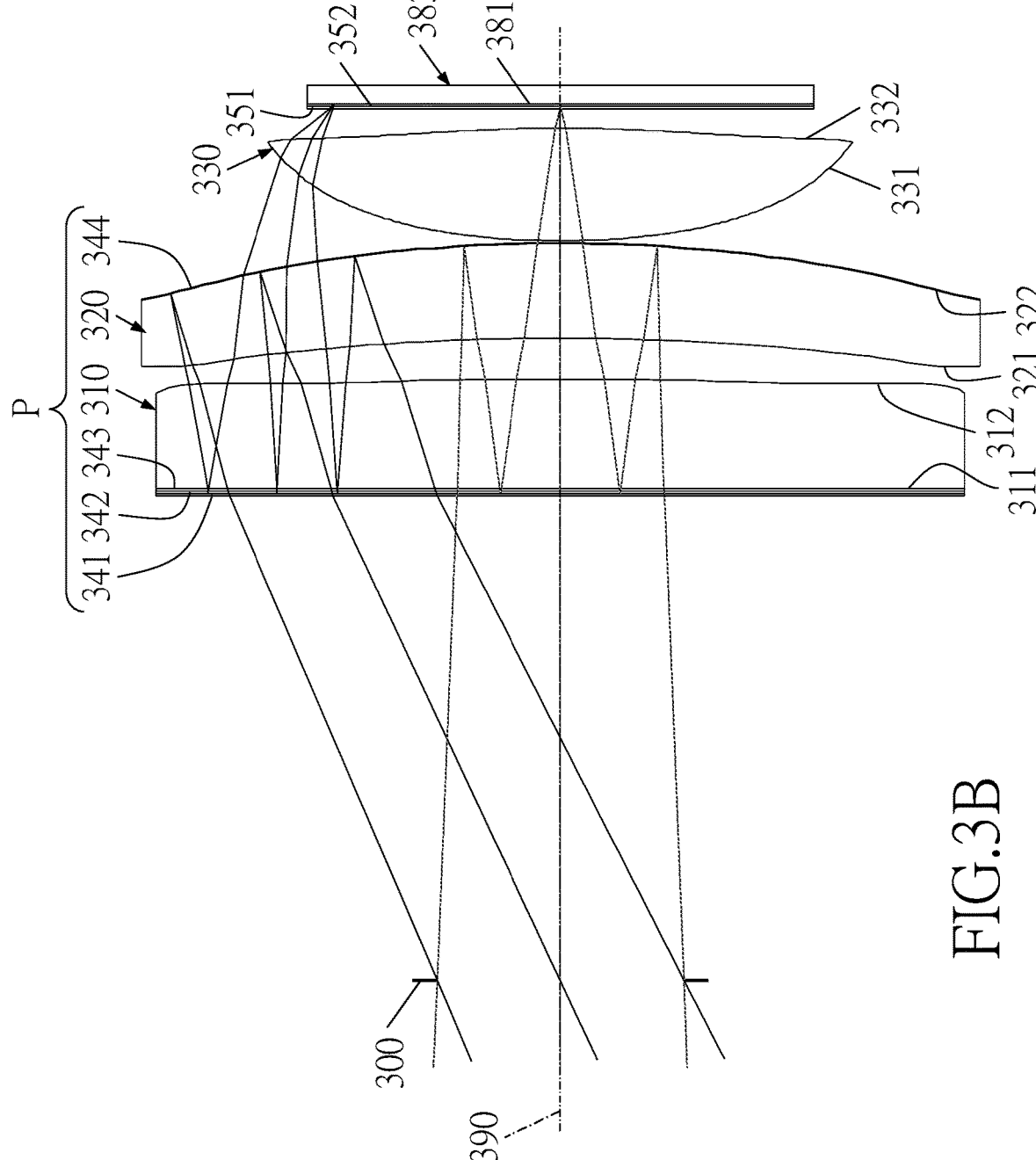
FIG. 3B is a schematic diagram of the optical lens assembly focusing on a near point in accordance with the third embodiment of the present invention.

Referring to FIGS. 3A and 3B, an optical lens assembly in accordance with a third embodiment of the present invention includes, in order from a visual side to an image source side along an optical axis 390: a stop 300, a first absorptive polarizer 341, a reflective polarizer 342, a first phase retarder 343, a first lens 310, a second lens 320, a partial-reflective-partial-transmissive element 344, a third lens 330, a second phase retarder 351, a second absorptive polarizer 352 and an image source plane 381. Wherein the first absorptive polarizer 341, the reflective polarizer 342, the first phase retarder 343, the first lens 310, the second lens 320 and the partial-reflective-partial-transmissive element 344 form an optical group P. When the focus of the optical lens assembly changes from a near point (FIG. 3B) to a far point (FIG. 3A), the optical group P moves from the image source side to the visual side. The optical lens assembly has a total of three lenses with refractive power, but not is limited thereto.

The stop 300 may be located in a position where the user's eyes view an image.

The first lens 310 with positive refractive power includes a visual-side surface 311 and an image source-side surface 312, the visual-side surface 311 of the first lens 310 is flat in a paraxial region thereof, the image source-side surface 312 of the first lens 310 is convex in a paraxial region thereof, the image source-side surface 312 of the first lens 310 is aspheric, and the first lens 310 is made of plastic.

The second lens 320 with positive refractive power includes a visual-side surface 321 and an image source-side surface 322, the visual-side surface 321 of the second lens 320 is concave in a paraxial region thereof, the image source-side surface 322 of the second lens 320 is convex in a paraxial region thereof, the visual-side surface 321 and the image source-side surface 322 of the second lens 320 are aspheric, and the second lens 320 is made of plastic.

The third lens 330 with positive refractive power includes a visual-side surface 331 and an image source-side surface 332, the visual-side surface 331 of the third lens 330 is convex in a paraxial region thereof, the image source-side surface 332 of the third lens 330 is convex in a paraxial region thereof, the visual-side surface 331 and the image source-side surface 332 of the third lens 330 are aspheric, and the third lens 330 is made of plastic.

The configuration modes and characteristics of the first phase retarder 343, the reflective polarizer 342 and the first absorptive polarizer 341 may refer to that of the first phase retarder 143, the reflective polarizer 142 and the first absorptive polarizer 141 of the first embodiment and will not be explained again.

The partial-reflective-partial-transmissive element 344 is disposed on (for example, but not limited to, coating) the image source-side surface 322 of the second lens 320 and has an average reflectance of at least 30%, preferably 50%, in the wavelength range of visible light. The average reflectance here is an average value of different reflectance of the partial-reflective-partial-transmissive element 344 for different wavelengths. The partial-reflective-partial-transmissive element 344 is disposed between the first lens 310 and the third lens 330.

The configuration modes and characteristics of the second absorptive polarizer 352 and the second phase retarder 351 may refer to that of the second absorptive polarizer 152 and the second phase retarder 151 of the first embodiment and will not be explained again.

The optical lens assembly works in cooperation with an image source 383 disposed on the image source plane 381. In the present embodiment, the type of the image source 383 is, for example, but not limited to, an OLED display, a LED display, a liquid crystal display, or other displays.

Please refer to Tables 9-12, Table 9 shows the detailed optical data of the elements of the optical lens assembly of the third embodiment, Table 10 shows the data of the aspherical surfaces of the lenses of the optical lens assembly of the third embodiment, Table 11 shows the remaining parameters of the optical lens assembly of the third embodiment and the values thereof, and the values of the parameters in Tables 9 and 11 meet the conditional formulas of Table 12. In the third embodiment, the equation of the aspheric surface profiles of the aforementioned lenses is the same as the equation of the aspheric surface profiles of the aforementioned lenses in the first embodiment. The definitions of the surfaces in Table 9 can be referred to the relevant description of Table 1 and will not be explained again.

TABLE 9

Embodiment 3
Near point: f_N = 18.93 mm, EPD = 10.00 mm, FOV_N = 49.51°
Far point: f_F = 20.55 mm, EPD = 10.00 mm, FOV_F = 52.00°

| Surface | | Radius of curvature | Thickness/gap | | Refractive index (nd) | Abbe number (vd) | Refraction/ reflection |
|---|---|---|---|---|---|---|---|
| 0 | Stop | Infinity | Near point | 20.000 | — | — | — |
| | | | Far point | 16.000 | | | |
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 4.516 | | 1.544 | 55.9 | Refraction |
| 5 | | −205.944 | 1.665 | | — | — | — |
| 6 | Second lens | −129.622 | 3.932 | | 1.544 | 55.9 | Refraction |
| 7 | Partial-reflective-partial-transmissive element | −67.948 | −3.932 | | mirror | | Reflection |
| 8 | | −129.622 | −1.665 | | — | | — |
| 9 | First lens | −205.944 | −4.516 | | 1.544 | 55.9 | Refraction |
| 10 | First phase retarder | Infinity | −0.100 | | 1.533 | 56.0 | Refraction |
| 11 | Reflective polarizer | Infinity | −0.100 | | 1.533 | 56.0 | Refraction |
| 12 | Reflective polarizer | Infinity | 0.100 | | mirror | | Reflection |
| 13 | First phase retarder | Infinity | 0.100 | | 1.533 | 56.0 | Refraction |
| 14 | First lens | Infinity | 4.516 | | 1.544 | 55.900 | Refraction |
| 15 | | −205.944 | 1.665 | | — | — | — |
| 16 | Second lens | −129.622 | 3.932 | | 1.544 | 55.900 | Refraction |
| 17 | Partial-reflective-partial-transmissive element | −67.948 | Near point | 0.100 | — | — | Refraction |
| | | | Far point | 3.959 | | | |
| 18 | Third lens | 33.977 | 4.628 | | 1.544 | 55.900 | Refraction |
| 19 | | −65.974 | 0.800 | | — | — | Refraction |

TABLE 9-continued

Embodiment 3
Near point: f_N = 18.93 mm, EPD = 10.00 mm, FOV_N = 49.51°
Far point: f_F = 20.55 mm, EPD = 10.00 mm, FOV_F = 52.00°

| Surface | | Radius of curvature | Thickness/gap | Refractive index (nd) | Abbe number (vd) | Refraction/ reflection |
|---|---|---|---|---|---|---|
| 20 | Second phase retarder | Infinity | 0.100 | 1.533 | 56.0 | Refraction |
| 21 | Second absorptive polarizer | Infinity | 0.100 | 1.533 | 56.0 | Refraction |
| 22 | Image source plane | Infinity | — | — | — | — |

The reference wavelength is 555 nm.

TABLE 10

Embodiment 3
Aspheric Coefficients

| Surface | A visual-side surface of the first lens 4, 10, 14 | An image source-side surface of the first lens 5, 9, 15 | A visual-side surface of the second lens 6, 8, 16 | An image source-side surface of the second lens 7, 17 | A visual-side surface of the third lens 18 | An image source-side surface of the third lens 19 |
|---|---|---|---|---|---|---|
| K: | 0.0000E+00 | 9.0000E+01 | −9.0000E+01 | 3.6080E+00 | 4.2130E+00 | −5.7247E+01 |
| A2: | 0.0000E+00 | 0.0000E+00 | 0.0000E+00 | 0.0000E+00 | 0.0000E+00 | 0.0000E+00 |
| A4: | 0.0000E+00 | 8.5426E−08 | −1.0466E−05 | 1.4001E−06 | 6.5826E−05 | 1.5170E−05 |
| A6: | 0.0000E+00 | −8.1986E−08 | −5.1894E−07 | −1.3597E−07 | −4.8277E−07 | 7.1623E−09 |
| A8: | 0.0000E+00 | 1.8227E−09 | 9.6176E−09 | 2.0666E−09 | 3.9002E−09 | 1.9308E−10 |
| A10: | 0.0000E+00 | 6.1918E−12 | −5.6606E−11 | −1.3728E−11 | 5.5524E−12 | 6.3900E−13 |
| A12: | 0.0000E+00 | −1.7273E−13 | 6.6349E−14 | 3.9222E−14 | −3.4553E−14 | 1.1381E−15 |
| A14: | 0.0000E+00 | 7.9215E−16 | 4.0842E−16 | −3.2817E−17 | −2.9092E−16 | 1.7640E−16 |
| A16: | 0.0000E+00 | −1.1587E−18 | −9.9200E−19 | −1.8953E−20 | 1.8876E−18 | −2.6271E−18 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 11

Embodiment 3

| f_N [mm] | 18.93 | R4[mm] | −67.95 | CA2 [mm] | 15.05 |
|---|---|---|---|---|---|
| f_F [mm] | 20.55 | R5[mm] | 33.98 | CA3 [mm] | 15.21 |
| f12 [mm] | 154.20 | R6[mm] | −65.97 | CA5 [mm] | 11.33 |
| f1 [mm] | 377.41 | CT1[mm] | 4.52 | CA6 [mm] | 10.91 |
| f2 [mm] | 255.95 | CT2[mm] | 3.93 | TDP2 [mm] | 0.22 |
| f3 [mm] | 41.78 | CT3[mm] | 4.63 | TDP3 [mm] | 1.15 |
| R2 [mm] | −205.94 | T23_N[mm] | 0.10 | TDP5 [mm] | 3.42 |
| R3 [mm] | −129.62 | T23_F[mm] | 3.96 | TDP6 [mm] | 0.46 |

TABLE 12

Embodiment 3

| f_N/f_F | 0.92 | R6/R2 | 0.32 |
|---|---|---|---|
| f12/f3 | 3.69 | R3/CT2 | −32.97 |
| R3*R5/f2[mm] | −17.21 | CT1/CT2 | 1.15 |
| f2/f3 | 6.13 | (CT1 + CT2)/CT3 | 1.83 |
| f1/f2 | 1.47 | (T23_F − T23_N)/ (f_F − f_N) | 2.39 |
| (f_N*f_F)/f12[mm] | 2.52 | CA2/TDP2 | 67.47 |
| R2/CT1 | −45.60 | CA3/TDP3 | 13.26 |
| R3/R4 | 1.91 | CA5/TDP5 | 3.31 |
| R6/R5 | −1.94 | CA6/TDP6 | 23.84 |

Fourth Embodiment

Figure 4A:
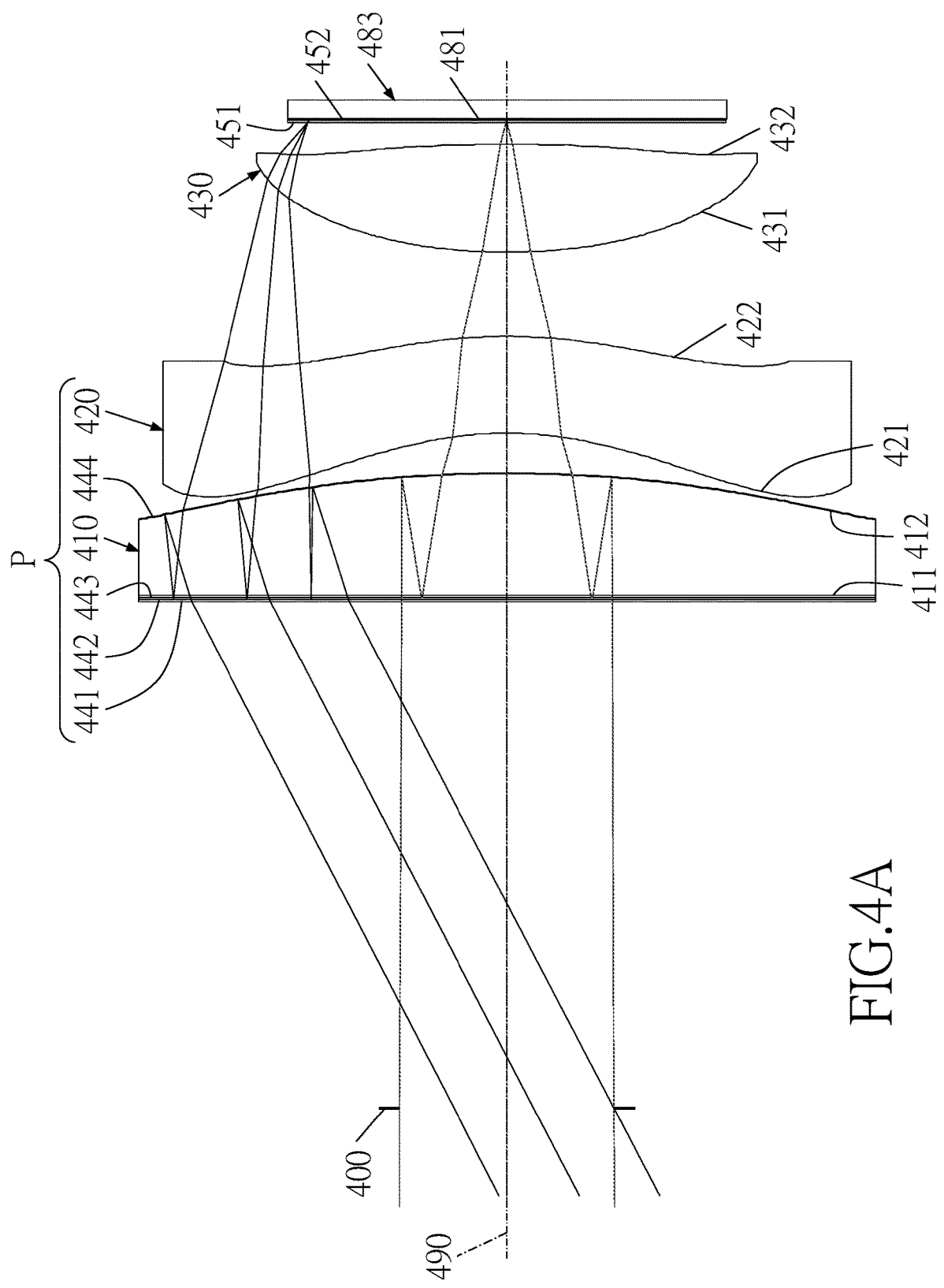
FIG. 4A is a schematic diagram of an optical lens assembly focusing on a far point in accordance with a fourth embodiment of the present invention.
Figure 4B:
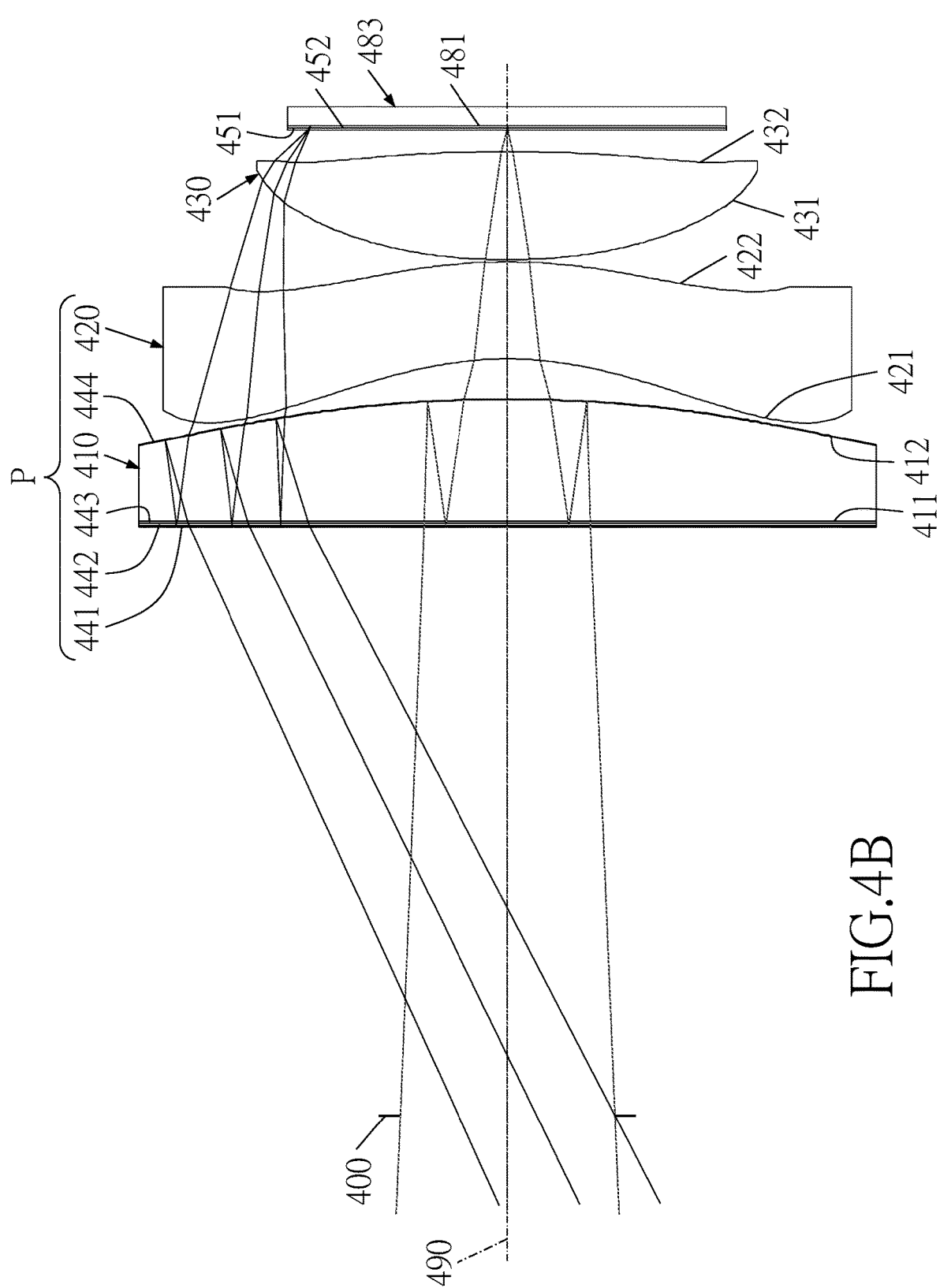
FIG. 4B is a schematic diagram of the optical lens assembly focusing on a near point in accordance with the fourth embodiment of the present invention.

Referring to FIGS. 4A and 4B, an optical lens assembly in accordance with a fourth embodiment of the present invention includes, in order from a visual side to an image source side along an optical axis 490: a stop 400, a first absorptive polarizer 441, a reflective polarizer 442, a first phase retarder 443, a first lens 410, a partial-reflective-partial-transmissive element 444, a second lens 420, a third lens 430, a second phase retarder 451, a second absorptive polarizer 452 and an image source plane 481. Wherein the first absorptive polarizer 441, the reflective polarizer 442, the first phase retarder 443, the first lens 410, the partial-reflective-partial-transmissive element 444 and the second lens 420 form an optical group P. When the focus of the optical lens assembly changes from a near point (FIG. 4B) to a far point (FIG. 4A), the optical group P moves from the image source side to the visual side. The optical lens assembly has a total of three lenses with refractive power, but not is limited thereto.

The stop 400 may be located in a position where the user's eyes view an image.

The first lens 410 with positive refractive power includes a visual-side surface 411 and an image source-side surface 412, the visual-side surface 411 of the first lens 410 is flat in a paraxial region thereof, the image source-side surface 412 of the first lens 410 is convex in a paraxial region thereof, the image source-side surface 412 of the first lens 410 is aspheric, and the first lens 410 is made of plastic.

The second lens 420 with negative refractive power includes a visual-side surface 421 and an image source-side surface 422, the visual-side surface 421 of the second lens 420 is concave in a paraxial region thereof, the image source-side surface 422 of the second lens 420 is convex in a paraxial region thereof, the visual-side surface 421 and the image source-side surface 422 of the second lens 420 are aspheric, and the second lens 420 is made of plastic.

The third lens 430 with positive refractive power includes a visual-side surface 431 and an image source-side surface 432, the visual-side surface 431 of the third lens 430 is convex in a paraxial region thereof, the image source-side surface 432 of the third lens 430 is convex in a paraxial region thereof, the visual-side surface 431 and the image source-side surface 432 of the third lens 430 are aspheric, and the third lens 430 is made of plastic.

The configuration modes and characteristics of the first phase retarder 443, the reflective polarizer 442 and the first absorptive polarizer 441 may refer to that of the first phase retarder 143, the reflective polarizer 142 and the first absorptive polarizer 141 of the first embodiment and will not be explained again.

The partial-reflective-partial-transmissive element 444 is disposed on (for example, but not limited to, coating) the image source-side surface 412 of the first lens 410 and has an average reflectance of at least 30%, preferably 50%, in the wavelength range of visible light. The average reflectance here is an average value of different reflectance of the partial-reflective-partial-transmissive element 444 for different wavelengths. The partial-reflective-partial-transmissive element 444 is disposed between the first lens 410 and the third lens 430.

The configuration modes and characteristics of the second absorptive polarizer 452 and the second phase retarder 451 may refer to that of the second absorptive polarizer 152 and the second phase retarder 151 of the first embodiment and will not be explained again.

The optical lens assembly works in cooperation with an image source 483 disposed on the image source plane 481. In the present embodiment, the type of the image source 483 is, for example, but not limited to, an OLED display, a LED display, a liquid crystal display, or other displays.

Please refer to Tables 13-16, Table 13 shows the detailed optical data of the elements of the optical lens assembly of the fourth embodiment, Table 14 shows the data of the aspherical surfaces of the lenses of the optical lens assembly of the fourth embodiment, Table 15 shows the remaining parameters of the optical lens assembly of the fourth embodiment and the values thereof, and the values of the parameters in Tables 13 and 15 meet the conditional formulas of Table 16. In the fourth embodiment, the equation of the aspheric surface profiles of the aforementioned lenses is the same as the equation of the aspheric surface profiles of the aforementioned lenses in the first embodiment. The definitions of the surfaces in Table 13 can be referred to the relevant description of Table 1 and will not be explained again.

TABLE 13

Embodiment 4

Near point: f_N = 18.23 mm, EPD = 10.00 mm, FOV_N = 50.03°
Far point: f_F = 19.85 mm, EPD = 10.00 mm, FOV_F = 54.00°

| Surface | | Radius of curvature | Thickness/gap | | Refractive index (nd) | Abbe number (vd) | Refraction/ reflection |
|---|---|---|---|---|---|---|---|
| 0 | Stop | Infinity | Near point | 24.000 | — | — | — |
| | | | Far point | 28.000 | | | |
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 5.800 | | 1.544 | 55.9 | Refraction |
| 5 | Partial-reflective- partial-transmissive element | −63.214 | −5.800 | | mirror | | Reflection |
| 6 | First phase retarder | Infinity | −0.100 | | 1.533 | 56.0 | Refraction |
| 7 | Reflective polarizer | Infinity | −0.100 | | 1.533 | 56.0 | Refraction |
| 8 | Reflective polarizer | Infinity | 0.100 | | mirror | | Reflection |
| 9 | First phase retarder | Infinity | 0.100 | | 1.533 | 56.0 | Refraction |
| 10 | First lens | Infinity | 5.800 | | 1.544 | 55.9 | Refraction |
| 11 | Partial-reflective- partial-transmissive element | −63.214 | 1.917 | | — | — | Refraction |
| 12 | Second lens | −16.446 | 4.620 | | 1.645 | 23.4 | Refraction |
| 13 | | −23.742 | Near point | 0.100 | — | — | Refraction |
| | | | Far point | 4.005 | | | |
| 14 | Third lens | 29.503 | 5.153 | | 1.544 | 55.9 | Refraction |
| 15 | | −75.326 | 1.000 | | — | — | Refraction |
| 16 | Second phase retarder | Infinity | 0.100 | | 1.533 | 56.0 | Refraction |
| 17 | Second absorptive polarizer | Infinity | 0.100 | | 1.533 | 56.0 | Refraction |
| 18 | Image source plane | Infinity | — | | — | — | — |

The reference wavelength is 555 nm.

TABLE 14

Embodiment 4
Aspheric Coefficients

| Surface | A visual-side surface of the first lens 4, 10 | An image source-side of the first lens 5, 11 | A visual-side surface of the second lens 12 | An image source-side of the second lens 13 | A visual-side surface of the third lens 14 | An image source-side of the third lens 15 |
|---|---|---|---|---|---|---|
| K: | 0.0000E+00 | 0.0000E+00 | −3.3715E−01 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 0.0000E+00 | 5.8642E−07 | 1.1004E−04 | 9.3024E−05 | 1.0439E−04 | −1.0632E−05 |
| A6: | 0.0000E+00 | −4.0571E−09 | −1.0771E−07 | −5.8775E−08 | −9.9230E−07 | −2.0072E−07 |
| A8: | 0.0000E+00 | 3.4430E−11 | −6.0086E−11 | 8.6571E−11 | 7.9866E−09 | 7.5421E−09 |
| A10: | 0.0000E+00 | −9.8661E−14 | 1.5827E−12 | 2.9020E−13 | −9.0388E−12 | 5.2755E−11 |
| A12: | 0.0000E+00 | 2.1311E−16 | 7.7891E−15 | 7.4525E−15 | −1.1700E−13 | −2.8153E−12 |
| A14: | 0.0000E+00 | 9.3374E−19 | −4.5242E−17 | −7.8763E−17 | −8.6927E−16 | 3.0451E−14 |
| A16: | 0.0000E+00 | −1.9538E−21 | 7.4175E−20 | 4.0155E−19 | 1.3274E−17 | −1.0463E−16 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 15

Embodiment 4

| | | | | | |
|---|---|---|---|---|---|
| f_N [mm] | 18.23 | R4[mm] | −23.74 | CA2 [mm] | 16.00 |
| f_F [mm] | 19.85 | R5[mm] | 29.50 | CA3 [mm] | 14.91 |
| f12 [mm] | −1078.94 | R6[mm] | −75.33 | CA5 [mm] | 11.41 |
| f1 [mm] | 115.85 | CT1[mm] | 5.80 | CA6 [mm] | 10.85 |
| f2 [mm] | −110.49 | CT2[mm] | 4.62 | TDP2 [mm] | 1.96 |
| f3 [mm] | 39.54 | CT3[mm] | 5.15 | TDP3 [mm] | 2.94 |
| R2 [mm] | −63.21 | T23_N[mm] | 0.10 | TDP5 [mm] | 3.80 |
| R3 [mm] | −16.45 | T23_F[mm] | 4.00 | TDP6 [mm] | 0.43 |

TABLE 16

Embodiment 4

| | | | |
|---|---|---|---|
| f_N/f_F | 0.92 | R6/R2 | 1.19 |
| f12/f3 | −27.29 | R3/CT2 | −3.56 |
| R3*R5/f2[mm] | 4.39 | CT1/CT2 | 1.26 |
| f2/f3 | −2.79 | (CT1 + CT2)/CT3 | 2.02 |
| f1/f2 | −1.05 | (T23_F − T23_N)/(f_F − f_N) | 2.40 |
| (f_N*f_F)/f12[mm] | −0.34 | CA2/TDP2 | 8.17 |
| R2/CT1 | −10.90 | CA3/TDP3 | 5.08 |
| R3/R4 | 0.69 | CA5/TDP5 | 3.00 |
| R6/R5 | −2.55 | CA6/TDP6 | 25.20 |

Fifth Embodiment

Figure 5A:
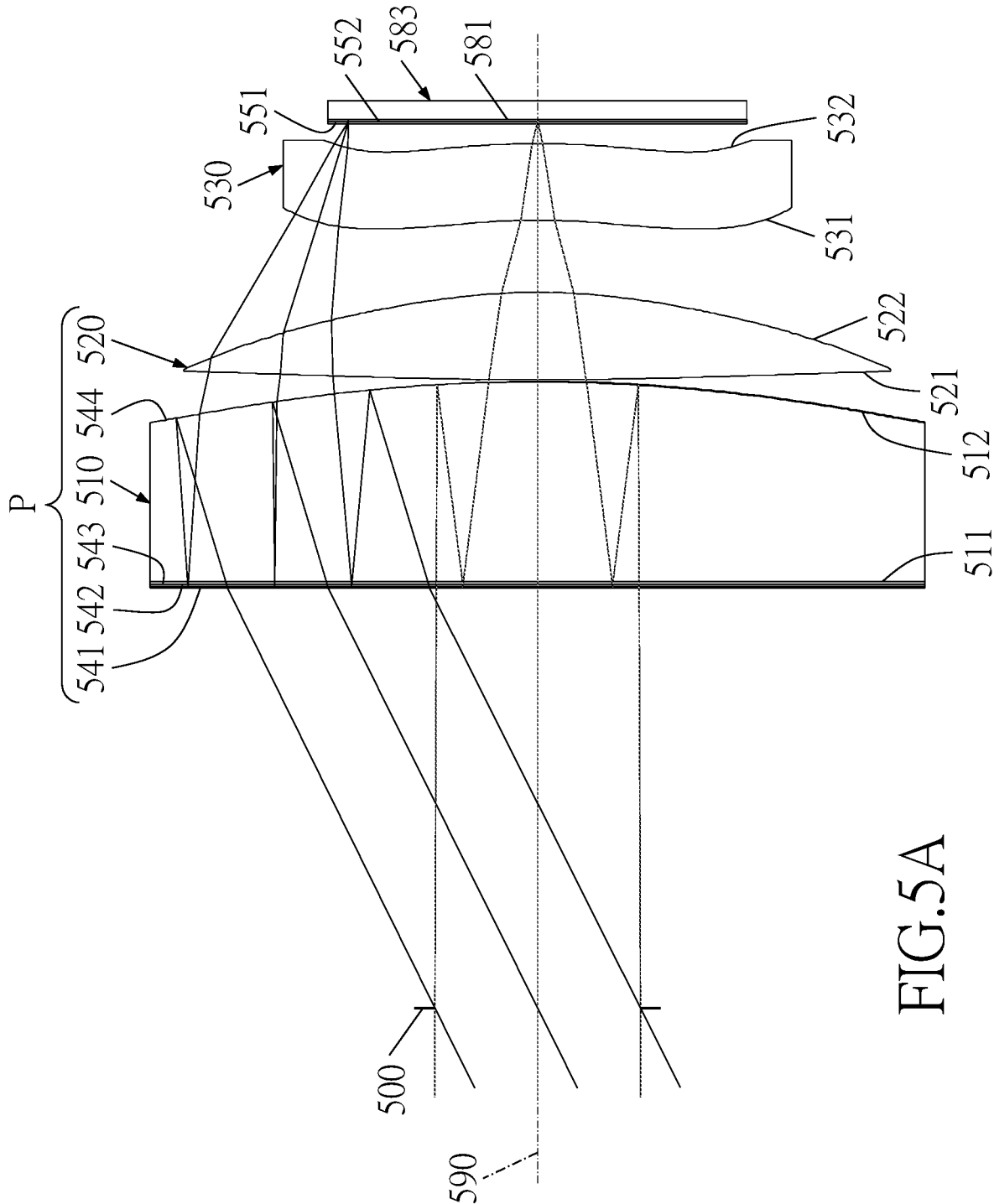
FIG. 5A is a schematic diagram of an optical lens assembly focusing on a far point in accordance with a fifth embodiment of the present invention.
Figure 5B:
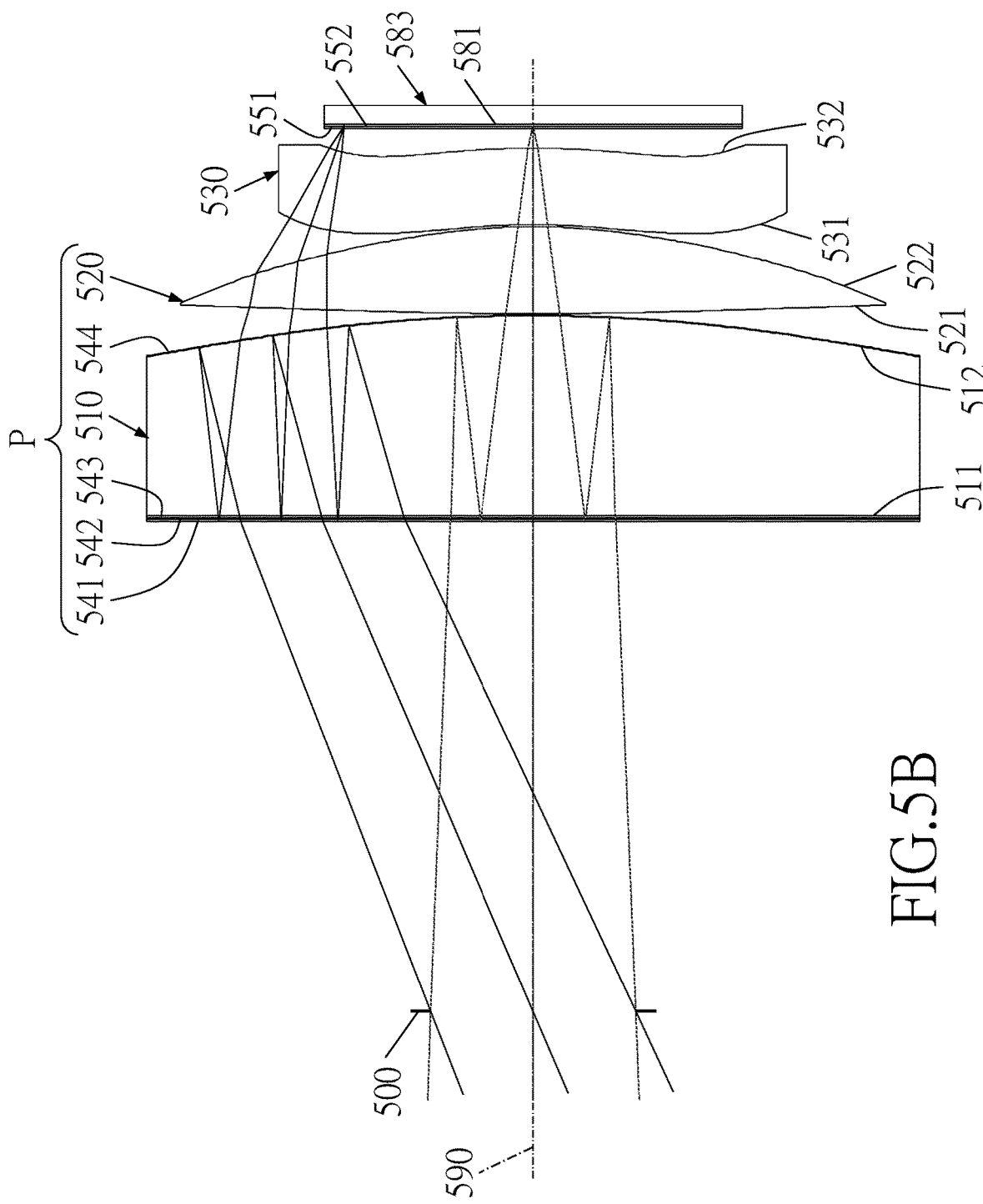
FIG. 5B is a schematic diagram of the optical lens assembly focusing on a near point in accordance with the fifth embodiment of the present invention.

Referring to FIGS. 5A and 5B, an optical lens assembly in accordance with a fifth embodiment of the present invention includes, in order from a visual side to an image source side along an optical axis 590: a stop 500, a first absorptive polarizer 541, a reflective polarizer 542, a first phase retarder 543, a first lens 510, a partial-reflective-partial-transmissive element 544, a second lens 520, a third lens 530, a second phase retarder 551, a second absorptive polarizer 552 and an image source plane 581. Wherein the first absorptive polarizer 541, the reflective polarizer 542, the first phase retarder 543, the first lens 510, the partial-reflective-partial-transmissive element 544 and the second lens 520 form an optical group P. When the focus of the optical lens assembly changes from a near point (FIG. 5B) to a far point (FIG. 5A), the optical group P moves from the image source side to the visual side. The optical lens assembly has a total of three lenses with refractive power, but not is limited thereto.

The stop 500 may be located in a position where the user's eyes view an image.

The first lens 510 with positive refractive power includes a visual-side surface 511 and an image source-side surface 512, the visual-side surface 511 of the first lens 510 is flat in a paraxial region thereof, the image source-side surface 512 of the first lens 510 is convex in a paraxial region thereof, the image source-side surface 512 of the first lens 510 is aspheric, and the first lens 510 is made of plastic.

The second lens 520 with positive refractive power includes a visual-side surface 521 and an image source-side surface 522, the visual-side surface 521 of the second lens 520 is convex in a paraxial region thereof, the image source-side surface 522 of the second lens 520 is convex in a paraxial region thereof, the visual-side surface 521 and the image source-side surface 522 of the second lens 520 are aspheric, and the second lens 520 is made of plastic.

The third lens 530 with negative refractive power includes a visual-side surface 531 and an image source-side surface 532, the visual-side surface 531 of the third lens 530 is concave in a paraxial region thereof, the image source-side surface 532 of the third lens 530 is convex in a paraxial region thereof, the visual-side surface 531 and the image source-side surface 532 of the third lens 530 are aspheric, and the third lens 530 is made of plastic.

The configuration modes and characteristics of the first phase retarder 543, the reflective polarizer 542 and the first absorptive polarizer 541 may refer to that of the first phase retarder 143, the reflective polarizer 142 and the first absorptive polarizer 141 of the first embodiment and will not be explained again.

The partial-reflective-partial-transmissive element 544 is disposed on (for example, but not limited to, coating) the image source-side surface 512 of the first lens 510 and has an average reflectance of at least 30%, preferably 50%, in the wavelength range of visible light. The average reflectance here is an average value of different reflectance of the partial-reflective-partial-transmissive element 544 for different wavelengths. The partial-reflective-partial-transmissive element 544 is disposed between the first lens 510 and the third lens 530.

The configuration modes and characteristics of the second absorptive polarizer 552 and the second phase retarder 551 may refer to that of the second absorptive polarizer 152 and the second phase retarder 151 of the first embodiment and will not be explained again.

The optical lens assembly works in cooperation with an image source 583 disposed on the image source plane 581.

In the present embodiment, the type of the image source 583 is, for example, but not limited to, an OLED display, a LED display, a liquid crystal display, or other displays.

Please refer to Tables 17-20, Table 17 shows the detailed optical data of the elements of the optical lens assembly of the fifth embodiment, Table 18 shows the data of the aspherical surfaces of the lenses of the optical lens assembly of the fifth embodiment, Table 19 shows the remaining parameters of the optical lens assembly of the fifth embodiment and the values thereof, and the values of the parameters in Tables 17 and 19 meet the conditional formulas of Table 20. In the fifth embodiment, the equation of the aspheric surface profiles of the aforementioned lenses is the same as the equation of the aspheric surface profiles of the aforementioned lenses in the first embodiment. The definitions of the surfaces in Table 17 can be referred to the relevant description of Table 1 and will not be explained again.

TABLE 17

Embodiment 5
Near point: f_N = 21.44 mm, EPD = 10.00 mm, FOV_N = 45.61°
Far point: f_F = 21.12 mm, EPD = 10.00 mm, FOV_F = 52.00°

| Surface | | Radius of curvature | Thickness/gap | | Refractive index (nd) | Abbe number (vd) | Refraction/ reflection |
|---|---|---|---|---|---|---|---|
| 0 | Stop | Infinity | Near point | 24.000 | — | — | — |
| | | | Far point | 21.000 | | | |
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 9.974 | | 1.544 | 55.9 | Refraction |
| 5 | Partial-reflective-partial-transmissive element | −79.763 | −9.974 | | | mirror | Reflection |
| 6 | First phase retarder | Infinity | −0.100 | | 1.533 | 56.0 | Refraction |
| 7 | Reflective polarizer | Infinity | −0.100 | | 1.533 | 56.0 | Refraction |
| 8 | Reflective polarizer | Infinity | 0.100 | | | mirror | Reflection |
| 9 | First phase retarder | Infinity | 0.100 | | 1.533 | 56.0 | Refraction |
| 10 | First lens | Infinity | 9.974 | | 1.544 | 55.9 | Refraction |
| 11 | Partial-reflective-partial-transmissive element | −79.763 | 0.101 | | — | — | Refraction |
| 12 | Second lens | 237.285 | 4.347 | | 1.544 | 55.9 | Refraction |
| 13 | | −30.313 | Near point | 0.102 | — | — | Refraction |
| | | | Far point | 3.596 | | | |
| 14 | Third lens | −29.921 | 3.814 | | 1.544 | 55.9 | Refraction |
| 15 | | −40.231 | 1.000 | | — | — | Refraction |
| 16 | Second phase retarder | Infinity | 0.100 | | 1.533 | 56.0 | Refraction |
| 17 | Second absorptive polarizer | Infinity | 0.100 | | 1.533 | 56.0 | Refraction |
| 18 | Image source plane | Infinity | — | | — | — | — |

The reference wavelength is 555 nm.

TABLE 18

Embodiment 5
Aspheric Coefficients

| Surface | A visual-side surface of the first lens 4, 10 | An image source-side of the first lens 5, 11 | A visual-side surface of the second lens 12 | An image source-side of the second lens 13 | A visual-side surface of the third lens 14 | An image source-side of the third lens 15 |
|---|---|---|---|---|---|---|
| K | 0.0000E+00 | −2.2252E+00 | −9.0000E+01 | −1.3725E+01 | −3.7385E+01 | 1.3526E+01 |
| A2: | 0.0000E+00 | 0.0000E+00 | 0.0000E+00 | 0.0000E+00 | 0.0000E+00 | 0.0000E+00 |
| A4: | 0.0000E+00 | 5.0009E−07 | −1.2593E−06 | −5.0375E−06 | 6.8134E−05 | 4.2394E−05 |
| A6: | 0.0000E+00 | 1.2273E−09 | −1.8817E−09 | −1.7647E−08 | 1.4468E−08 | 1.3510E−06 |
| A8: | 0.0000E+00 | 4.6039E−12 | −2.9496E−12 | −2.1427E−11 | 6.8641E−10 | 8.1550E−09 |
| A10: | 0.0000E+00 | −1.0188E−14 | −3.0132E−15 | 1.5119E−13 | 6.7474E−13 | −1.0615E−10 |
| A12: | 0.0000E+00 | −8.6504E−18 | 6.8324E−18 | 3.4158E−16 | −6.9369E−15 | −3.1309E−13 |
| A14: | 0.0000E+00 | 1.1651E−19 | 1.0476E−19 | −3.6863E−18 | −7.3995E−17 | 7.1587E−15 |
| A16: | 0.0000E+00 | −1.3990E−22 | 6.6091E−22 | 6.9993E−21 | 5.1246E−19 | −2.2314E−18 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 19

| Embodiment 5 | | | | | |
|---|---|---|---|---|---|
| f_N [mm] | 21.44 | R4[mm] | −30.31 | CA2 [mm] | 17.63 |
| f_F [mm] | 21.12 | R5[mm] | −29.92 | CA3 [mm] | 16.03 |
| f12 [mm] | 37.50 | R6[mm] | −40.23 | CA5 [mm] | 11.88 |
| f1 [mm] | 146.17 | CT1[mm] | 9.97 | CA6 [mm] | 9.95 |
| f2 [mm] | 49.54 | CT2[mm] | 4.35 | TDP2 [mm] | 1.81 |
| f3 [mm] | −246.11 | CT3[mm] | 3.81 | TDP3 [mm] | 0.39 |
| R2 [mm] | −79.76 | T23_N[mm] | 0.10 | TDP5 [mm] | 0.34 |
| R3 [mm] | 237.29 | T23_F[mm] | 3.60 | TDP6 [mm] | 0.01 |

TABLE 20

| Embodiment 5 | | | |
|---|---|---|---|
| f_N/f_F | 1.02 | R6/R2 | 0.50 |
| f12/f3 | −0.15 | R3/CT2 | 54.59 |
| R3*R5/f2[mm] | −143.31 | CT1/CT2 | 2.29 |
| f2/f3 | −0.20 | (CT1 + CT2)/CT3 | 3.75 |
| f1/f2 | 2.95 | (T23_F − T23_N)/ (f_F − f_N) | −10.92 |
| (f_N*f_F)/f12[mm] | 12.07 | CA2/TDP2 | 9.75 |
| R2/CT1 | −8.00 | CA3/TDP3 | 41.48 |
| R3/R4 | −7.83 | CA5/TDP5 | 35.23 |
| R6/R5 | 1.34 | CA6/TDP6 | 1673.18 |

Sixth Embodiment

Figure 6A:
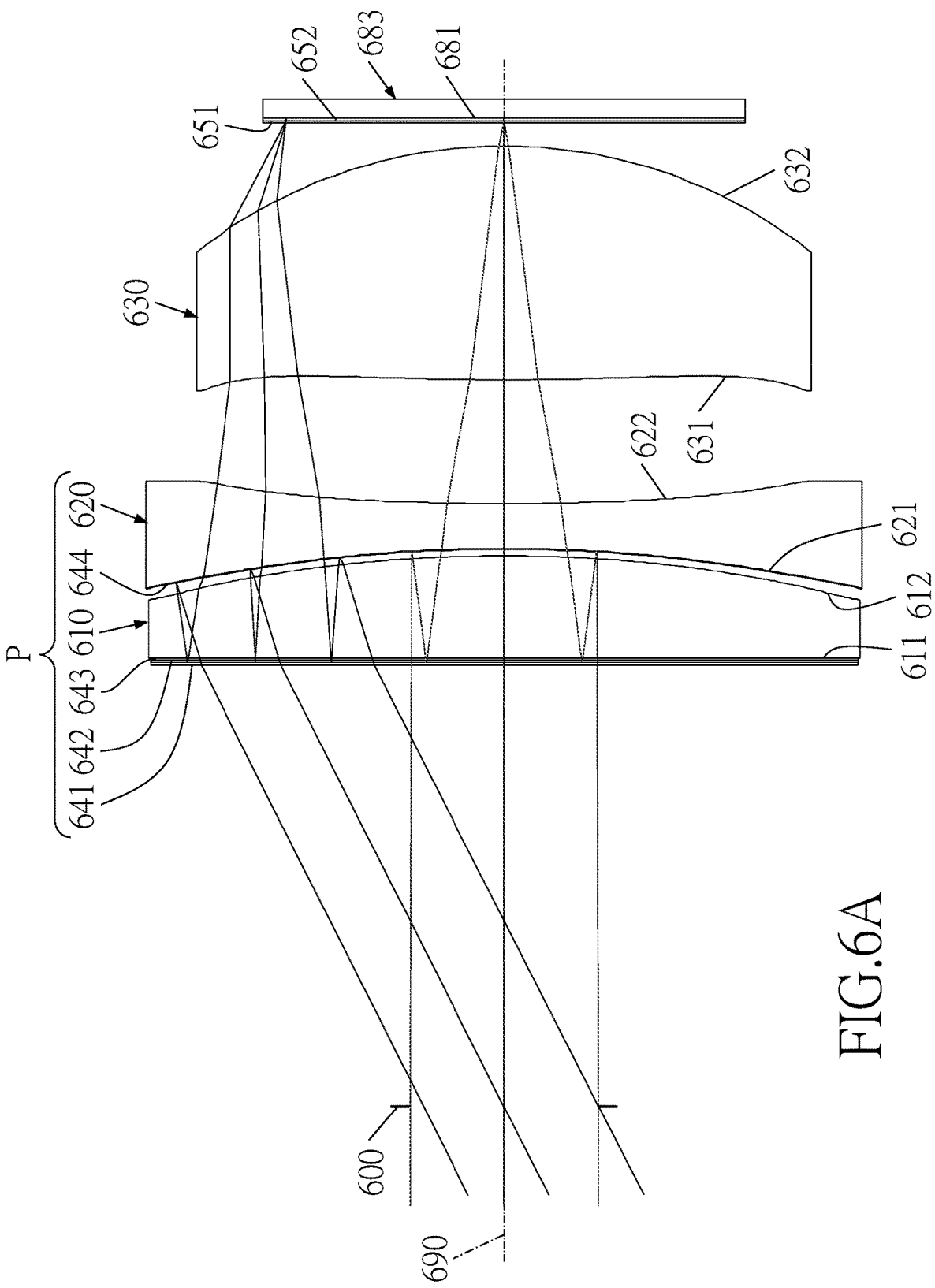
FIG. 6A is a schematic diagram of an optical lens assembly focusing on a far point in accordance with a sixth embodiment of the present invention.
Figure 6B:
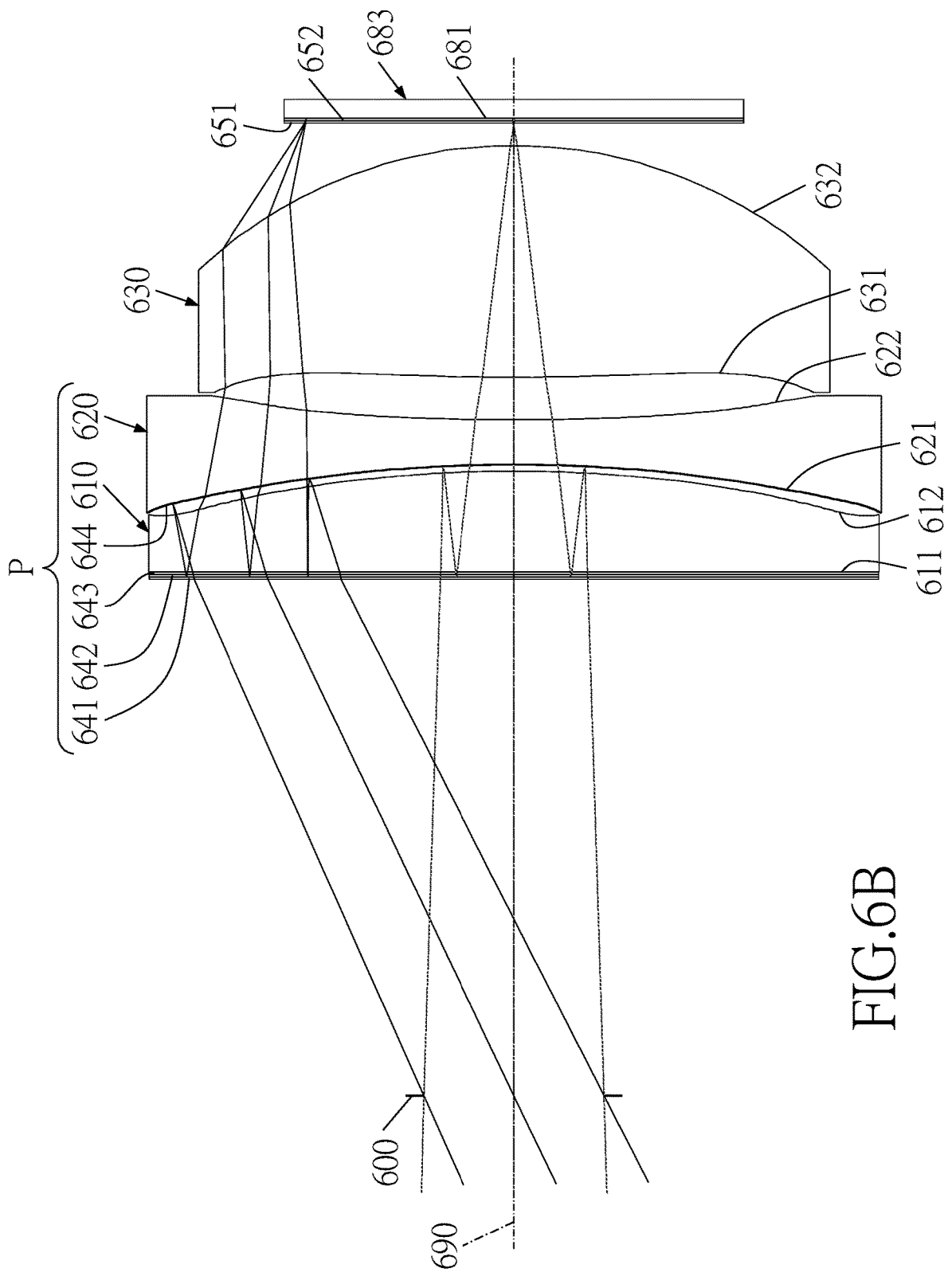
FIG. 6B is a schematic diagram of the optical lens assembly focusing on a near point in accordance with the sixth embodiment of the present invention.

Referring to FIGS. 6A and 6B, an optical lens assembly in accordance with a sixth embodiment of the present invention includes, in order from a visual side to an image source side along an optical axis 690: a stop 600, a first absorptive polarizer 641, a reflective polarizer 642, a first phase retarder 643, a first lens 610, a partial-reflective-partial-transmissive element 644, a second lens 620, a third lens 630, a second phase retarder 651, a second absorptive polarizer 652 and an image source plane 681. Wherein the first absorptive polarizer 641, the reflective polarizer 642, the first phase retarder 643, the first lens 610, the partial-reflective-partial-transmissive element 644 and the second lens 620 form an optical group P. When the focus of the optical lens assembly changes from a near point (FIG. 6B) to a far point (FIG. 6A), the optical group P moves from the image source side to the visual side. The optical lens assembly has a total of three lenses with refractive power, but not is limited thereto.

The stop 600 may be located in a position where the user's eyes view an image.

The first lens 610 with positive refractive power includes a visual-side surface 611 and an image source-side surface 612, the visual-side surface 611 of the first lens 610 is flat in a paraxial region thereof, the image source-side surface 612 of the first lens 610 is convex in a paraxial region thereof, the image source-side surface 612 of the first lens 610 is aspheric, and the first lens 610 is made of plastic.

The second lens 620 with negative refractive power includes a visual-side surface 621 and an image source-side surface 622, the visual-side surface 621 of the second lens 620 is concave in a paraxial region thereof, the image source-side surface 622 of the second lens 620 is concave in a paraxial region thereof, the visual-side surface 621 and the image source-side surface 622 of the second lens 620 are aspheric, and the second lens 620 is made of plastic.

The third lens 630 with positive refractive power includes a visual-side surface 631 and an image source-side surface 632, the visual-side surface 631 of the third lens 630 is convex in a paraxial region thereof, the image source-side surface 632 of the third lens 630 is convex in a paraxial region thereof, the visual-side surface 631 of the third lens 630 is aspheric, the image source-side surface 632 of the third lens 630 is spherical, and the third lens 630 is made of plastic.

The configuration modes and characteristics of the first phase retarder 643, the reflective polarizer 642 and the first absorptive polarizer 641 may refer to that of the first phase retarder 143, the reflective polarizer 142 and the first absorptive polarizer 141 of the first embodiment and will not be explained again.

The partial-reflective-partial-transmissive element 644 is disposed on (for example, but not limited to, coating) the image source-side surface 622 of the second lens 620 and has an average reflectance of at least 30%, preferably 50%, in the wavelength range of visible light. The average reflectance here is an average value of different reflectance of the partial-reflective-partial-transmissive element 644 for different wavelengths. The partial-reflective-partial-transmissive element 644 is disposed between the first lens 610 and the third lens 630.

The configuration modes and characteristics of the second absorptive polarizer 652 and the second phase retarder 651 may refer to that of the second absorptive polarizer 152 and the second phase retarder 151 of the first embodiment and will not be explained again.

The optical lens assembly works in cooperation with an image source 683 disposed on the image source plane 681. In the present embodiment, the type of the image source 683 is, for example, but not limited to, an OLED display, a LED display, a liquid crystal display, or other displays.

Please refer to Tables 21-24, Table 21 shows the detailed optical data of the elements of the optical lens assembly of the sixth embodiment, Table 22 shows the data of the aspherical surfaces of the lenses of the optical lens assembly of the sixth embodiment, Table 23 shows the remaining parameters of the optical lens assembly of the sixth embodiment and the values thereof, and the values of the parameters in Tables 21 and 23 meet the conditional formulas of Table 24. In the sixth embodiment, the equation of the aspheric surface profiles of the aforementioned lenses is the same as the equation of the aspheric surface profiles of the aforementioned lenses in the first embodiment. The definitions of the surfaces in Table 21 can be referred to the relevant description of Table 1 and will not be explained again.

TABLE 21

| Embodiment 6 | | | | | | | |
|---|---|---|---|---|---|---|---|
| Near point: f_N = 18.81 mm, EPD = 10.00 mm, FOV_N = 50.80° | | | | | | | |
| Far point: f_F = 20.77 mm, EPD = 10.00 mm, FOV_F = 52.00° | | | | | | | |
| Surface | | Radius of curvature | Thickness/gap | | Refractive Index (nd) | Abbe number (vd) | Refraction/ reflection |
| 0 | Stop | Infinity | Near point Far point | 23.000 19.000 | — | — | — |

TABLE 21-continued

Embodiment 6
Near point: f_N = 18.81 mm, EPD = 10.00 mm, FOV_N = 50.80°
Far point: f_F = 20.77 mm, EPD = 10.00 mm, FOV_F = 52.00°

| Surface | | Radius of curvature | Thickness/gap | | Refractive Index (nd) | Abbe number (vd) | Refraction/ reflection |
|---|---|---|---|---|---|---|---|
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 4.501 | | 1.544 | 55.9 | Refraction |
| 5 | | −62.020 | 0.300 | | — | — | Refraction |
| 6 | Partial-reflective-partial-transmissive element | −65.788 | −0.300 | | mirror | | Reflection |
| 7 | | −62.020 | −4.501 | | 1.544 | 55.9 | Refraction |
| 8 | First phase retarder | Infinity | −0.100 | | 1.533 | 56.0 | Refraction |
| 9 | Reflective polarizer | Infinity | −0.100 | | 1.533 | 56.0 | Refraction |
| 10 | Reflective polarizer | Infinity | 0.100 | | mirror | | Reflection |
| 11 | First phase retarder | Infinity | 0.100 | | 1.533 | 56.0 | Refraction |
| 12 | First lens | Infinity | 4.501 | | 1.533 | 56.0 | Refraction |
| 13 | | −62.020 | 0.300 | | 1.544 | 55.9 | Refraction |
| 14 | Second lens | −65.788 | 2.000 | | 1.645 | 23.4 | Refraction |
| 15 | | 155.244 | Near point 1.680 Far point 5.429 | | — | — | Refraction |
| 16 | Third lens | 131.271 | 10.270 | | 1.544 | 55.9 | Refraction |
| 17 | | −20.514 | 1.000 | | — | — | Refraction |
| 18 | Second phase retarder | Infinity | 0.100 | | 1.533 | 56.0 | Refraction |
| 19 | Second absorptive polarizer | Infinity | 0.100 | | 1.533 | 56.0 | Refraction |
| 20 | Image source plane | Infinity | — | | — | — | — |

The reference wavelength is 555 nm.

TABLE 22

Embodiment 6
Aspheric Coefficients

| Surface | A visual-side surface of the first lens 4, 8, 12 | An image source-side of the first lens 5, 7, 13 | A visual-side surface of the second lens 6, 14 | An image source-side of the second lens 15 | A visual-side surface of the third lens 16 | An image source-side of the third lens 17 |
|---|---|---|---|---|---|---|
| K: | 0.0000E+00 | 6.1507E+00 | −3.9592E+00 | 8.5085E−01 | 9.0000E+01 | 0.0000E+00 |
| A2: | 0.0000E+00 | 0.0000E+00 | 0.0000E+00 | 0.0000E+00 | 0.0000E+00 | 0.0000E+00 |
| A4: | 0.0000E+00 | 2.1425E−07 | −9.3051E−07 | 2.0241E−05 | −1.6199E−06 | 0.0000E+00 |
| A6: | 0.0000E+00 | 1.6579E−08 | −1.5075E−08 | −4.5275E−08 | −4.6874E−07 | 0.0000E+00 |
| A8: | 0.0000E+00 | 8.5882E−11 | 3.0859E−11 | 2.4378E−10 | 3.3182E−09 | 0.0000E+00 |
| A10: | 0.0000E+00 | −8.0320E−13 | 1.0317E−13 | −6.5990E−13 | −1.8171E−11 | 0.0000E+00 |
| A12: | 0.0000E+00 | −2.3620E−15 | 1.6048E−15 | 7.3180E−16 | −5.8701E−14 | 0.0000E+00 |
| A14: | 0.0000E+00 | 2.8840E−18 | 3.3732E−18 | 4.7892E−17 | 9.2995E−16 | 0.0000E+00 |
| A16: | 0.0000E+00 | 6.0049E−20 | −4.1466E−20 | −3.5212E−19 | −2.5605E−18 | 0.0000E+00 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 23

Embodiment 6

| | | | | |
|---|---|---|---|---|
| f_N [mm] | 18.81 | R4[mm] | 155.24 | CA2 [mm] | 15.08 |
| f_F [mm] | 20.77 | R5[mm] | 131.27 | CA3 [mm] | 15.18 |
| f12 [mm] | −195.68 | R6[mm] | −20.51 | CA5 [mm] | 12.90 |
| f1 [mm] | 113.66 | CT1[mm] | 4.50 | CA6 [mm] | 13.03 |
| f2 [mm] | −71.48 | CT2[mm] | 2.00 | TDP2 [mm] | 1.94 |
| f3 [mm] | 33.31 | CT3[mm] | 10.27 | TDP3 [mm] | 1.74 |
| R2 [mm] | −62.02 | T23_N[mm] | 1.68 | TDP5 [mm] | 0.50 |
| R3 [mm] | −65.79 | T23_F[mm] | 5.43 | TDP6 [mm] | 4.67 |

TABLE 24

Embodiment 6

| | | | |
|---|---|---|---|
| f_N/f_F | 0.91 | R6/R2 | 0.33 |
| f12/f3 | −5.87 | R3/CT2 | −32.89 |
| R3*R5/f2[mm] | 120.82 | CT1/CT2 | 2.25 |
| f2/f3 | −2.15 | (CT1 + CT2)/CT3 | 0.63 |
| f1/f2 | −1.59 | (T23_F − T23_N)/ (f_F − f_N) | 1.91 |
| (f_N*f_F)/f12[mm] | −2.00 | CA2/TDP2 | 7.76 |
| R2/CT1 | −13.78 | CA3/TDP3 | 8.72 |
| R3/R4 | −0.42 | CA5/TDP5 | 25.58 |
| R6/R5 | −0.16 | CA6/TDP6 | 2.79 |

Seventh Embodiment

Figure 7A:
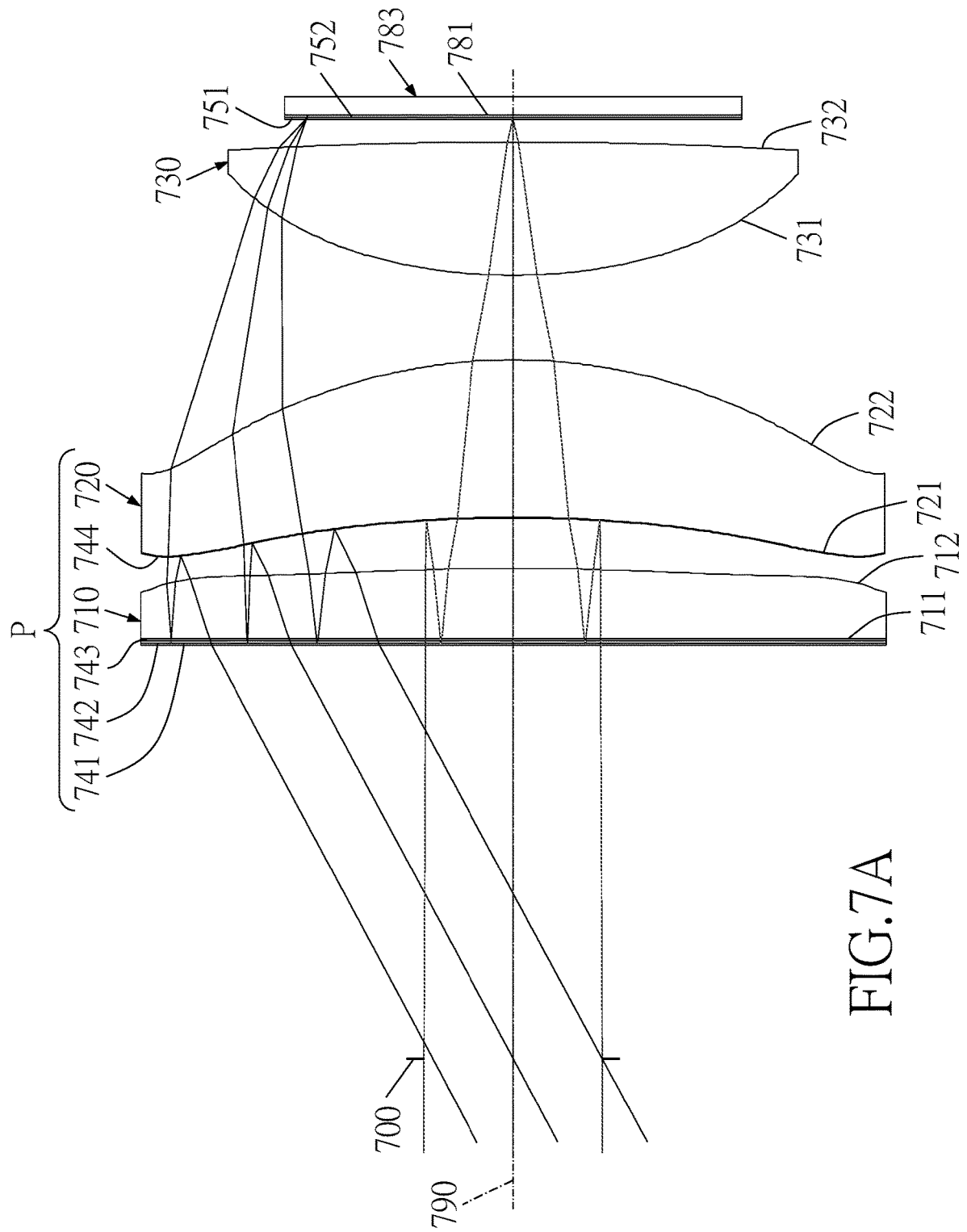
FIG. 7A is a schematic diagram of an optical lens assembly focusing on a far point in accordance with a seventh embodiment of the present invention.
Figure 7B:
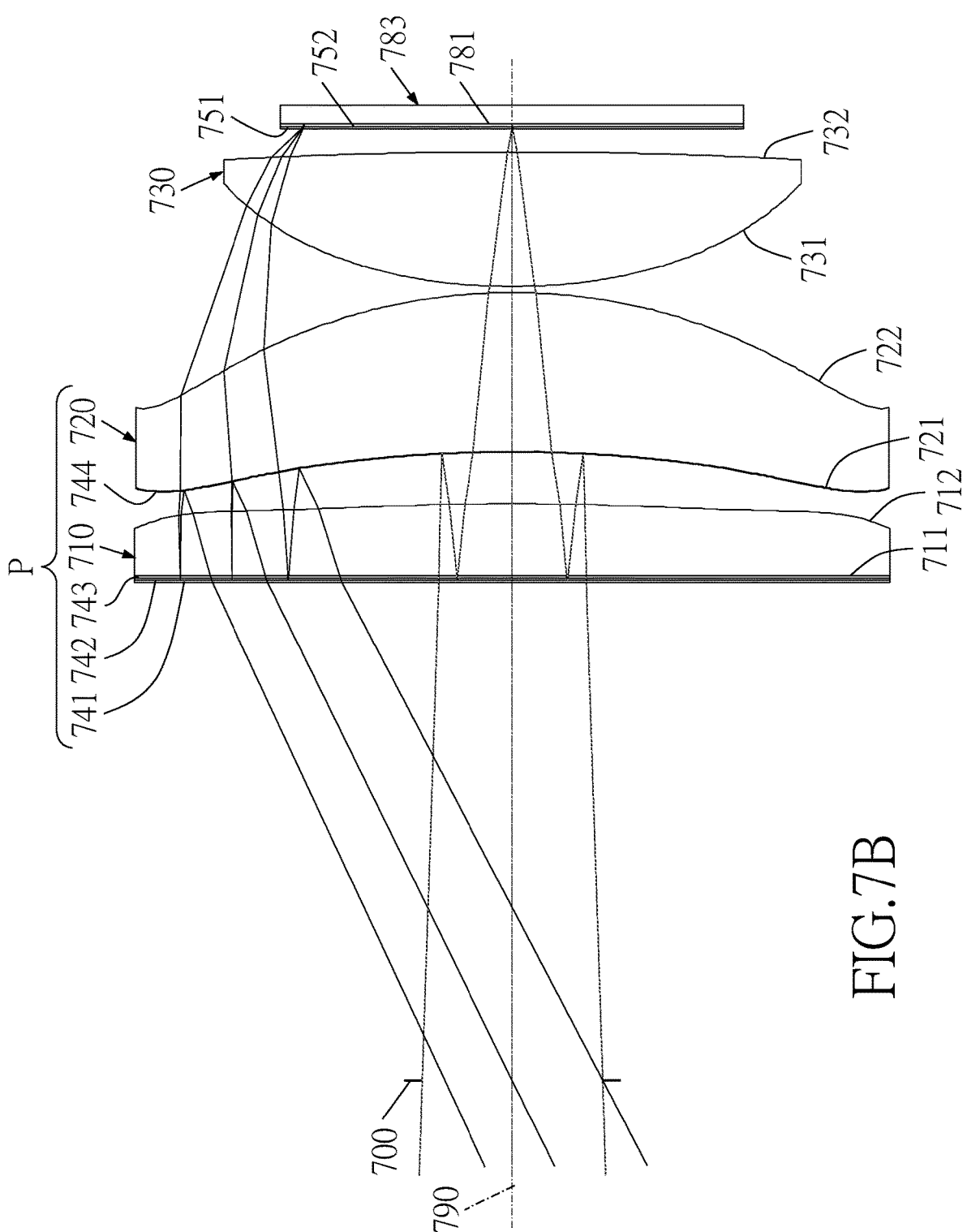
FIG. 7B is a schematic diagram of the optical lens assembly focusing on a near point in accordance with the seventh embodiment of the present invention.

Referring to FIGS. 7A and 7B, an optical lens assembly in accordance with a seventh embodiment of the present invention includes, in order from a visual side to an image source side along an optical axis 790: a stop 700, a first absorptive polarizer 741, a reflective polarizer 742, a first phase retarder 743, a first lens 710, a partial-reflective-partial-transmissive element 744, a second lens 720, a third lens 730, a second phase retarder 751, a second absorptive polarizer 752 and an image source plane 781. Wherein the first absorptive polarizer 741, the reflective polarizer 742, the first phase retarder 743, the first lens 710, the partial-reflective-partial-transmissive element 744 and the second lens 720 form an optical group P. When the focus of the optical lens assembly changes from a near point (FIG. 7B) to a far point (FIG. 7A), the optical group P moves from the image source side to the visual side. The optical lens assembly has a total of three lenses with refractive power, but not is limited thereto.

The stop 700 may be located in a position where the user's eyes view an image.

The first lens 710 with positive refractive power includes a visual-side surface 711 and an image source-side surface 712, the visual-side surface 711 of the first lens 710 is flat in a paraxial region thereof, the image source-side surface 712 of the first lens 710 is convex in a paraxial region thereof, the image source-side surface 712 of the first lens 710 is aspheric, and the first lens 710 is made of plastic.

The second lens 720 with positive refractive power includes a visual-side surface 721 and an image source-side surface 722, the visual-side surface 721 of the second lens 720 is concave in a paraxial region thereof, the image source-side surface 722 of the second lens 720 is convex in a paraxial region thereof, the visual-side surface 721 and the image source-side surface 722 of the second lens 720 are aspheric, and the second lens 720 is made of plastic.

The third lens 730 with positive refractive power includes a visual-side surface 731 and an image source-side surface 732, the visual-side surface 731 of the third lens 730 is convex in a paraxial region thereof, the image source-side surface 732 of the third lens 730 is convex in a paraxial region thereof, the visual-side surface 731 and the image source-side surface 732 of the third lens 730 are aspheric, and the third lens 730 is made of plastic.

The configuration modes and characteristics of the first phase retarder 743, the reflective polarizer 742 and the first absorptive polarizer 741 may refer to that of the first phase retarder 143, the reflective polarizer 142 and the first absorptive polarizer 141 of the first embodiment and will not be explained again.

The partial-reflective-partial-transmissive element 744 is disposed on (for example, but not limited to, coating) the image source-side surface 722 of the second lens 720 and has an average reflectance of at least 30%, preferably 50%, in the wavelength range of visible light. The average reflectance here is an average value of different reflectance of the partial-reflective-partial-transmissive element 744 for different wavelengths. The partial-reflective-partial-transmissive element 744 is disposed between the first lens 710 and the third lens 730.

The configuration modes and characteristics of the second absorptive polarizer 752 and the second phase retarder 751 may refer to that of the second absorptive polarizer 152 and the second phase retarder 151 of the first embodiment and will not be explained again.

The optical lens assembly works in cooperation with an image source 783 disposed on the image source plane 781. In the present embodiment, the type of the image source 783 is, for example, but not limited to, an OLED display, a LED display, a liquid crystal display, or other displays.

Please refer to Tables 25-28, Table 25 shows the detailed optical data of the elements of the optical lens assembly of the seventh embodiment, Table 26 shows the data of the aspherical surfaces of the lenses of the optical lens assembly of the seventh embodiment, Table 27 shows the remaining parameters of the optical lens assembly of the seventh embodiment and the values thereof, and the values of the parameters in Tables 25 and 27 meet the conditional formulas of Table 28. In the seventh embodiment, the equation of the aspheric surface profiles of the aforementioned lenses is the same as the equation of the aspheric surface profiles of the aforementioned lenses in the first embodiment. The definitions of the surfaces in Table 25 can be referred to the relevant description of Table 1 and will not be explained again.

TABLE 25

Embodiment 7
Near point: f_N = 17.33 mm, EPD = 10.00 mm, FOV_N = 51.92°
Far point: f_F = 18.61 mm, EPD = 10.00 mm, FOV_F = 56.00°

| Surface | | Radius of curvature | Thickness/gap | | Refractive index (nd) | Abbe number (vd) | Refraction/reflection |
|---|---|---|---|---|---|---|---|
| 0 | Stop | Infinity | Near point | 22.000 | — | — | — |
| | | | Far point | 19.000 | | | |
| 1 | First absorptive polarizer | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 3.202 | | 1.544 | 55.9 | Refraction |
| 5 | | −118.466 | 2.296 | | — | — | Refraction |
| 6 | Partial-reflective-partial-transmissive element | −65.014 | −2.296 | | mirror | | Reflection |
| 7 | | −118.466 | −3.202 | | 1.544 | 55.9 | Refraction |
| 8 | First phase retarder | Infinity | −0.100 | | 1.533 | 56.0 | Refraction |
| 9 | Reflective polarizer | Infinity | −0.100 | | 1.533 | 56.0 | Refraction |
| 10 | Reflective polarizer | Infinity | 0.100 | | mirrot | | Reflection |
| 11 | First phase retarder | Infinity | 0.100 | | 1.533 | 56.0 | Refraction |
| 12 | First lens | Infinity | 3.202 | | 1.544 | 55.9 | Refraction |
| 13 | | −118.466 | 2.296 | | | | Refraction |

TABLE 25-continued

Embodiment 7
Near point: f_N = 17.33 mm, EPD = 10.00 mm, FOV_N = 51.92°
Far point: f_F = 18.61 mm, EPD = 10.00 mm, FOV_F = 56.00°

| Surface | | Radius of curvature | Thickness/gap | | Refractive index (nd) | Abbe number (vd) | Refraction/ reflection |
|---|---|---|---|---|---|---|---|
| 14 | Second lens | −65.014 | 7.139 | | 1.544 | 55.9 | Refraction |
| 15 | | −24.786 | Near point | 0.263 | — | — | Refraction |
| | | | Far point | 3.823 | | | |
| 16 | Third lens | 25.646 | 6.026 | | 1.544 | 55.9 | Refraction |
| 17 | | −242.435 | 1.014 | | — | — | Refraction |
| 18 | Second phase retarder | Infinity | 0.100 | | 1.533 | 56.0 | Refraction |
| 19 | Second absorptive polarizer | Infinity | 0.100 | | 1.533 | 56.0 | Refraction |
| 20 | Image source plane | Infinity | — | | — | — | — |

The reference wavelength is 555 nm.

TABLE 26

Embodiment 7
Aspheric Coefficients

| Surface | A visual-side surface of the first lens 4, 8, 12 | An image source-side of the first lens 5, 7, 13 | A visual-side surface of the second lens 6, 14 | An image source-side of the second lens 15 | A visual-side surface of the third lens 16 | An image source-side of the third lens 17 |
|---|---|---|---|---|---|---|
| K: | 0.0000E+00 | −9.0000E+01 | 4.4494E+00 | −9.5738E−01 | 1.2500E+00 | 8.6222E+01 |
| A2: | 0.0000E+00 | 0.0000E+00 | 0.0000E+00 | 0.0000E+00 | 0.0000E+00 | 0.0000E+00 |
| A4: | 0.0000E+00 | 6.4641E−06 | −2.6462E−06 | −1.8790E−06 | 9.7834E−06 | −9.4289E−07 |
| A6: | 0.0000E+00 | 2.6184E−08 | −2.0106E−09 | −6.9905E−08 | 8.1487E−08 | −1.8056E−09 |
| A8: | 0.0000E+00 | 7.0599E−11 | −8.4880E−12 | 2.7057E−10 | 3.3817E−10 | 1.7811E−11 |
| A10: | 0.0000E+00 | −5.0027E−13 | −1.6600E−13 | −2.0158E−13 | −2.9904E−13 | 2.2284E−13 |
| A12: | 0.0000E+00 | −3.3036E−15 | 1.5738E−15 | −3.0318E−15 | 1.2211E−15 | 1.3539E−15 |
| A14: | 0.0000E+00 | −5.8454E−18 | 1.6061E−17 | 1.7544E−17 | −3.6791E−17 | 1.9109E−18 |
| A16: | 0.0000E+00 | 3.9822E−20 | −4.0955E−20 | 0.0000E+00 | 0.0000E+00 | −8.8071E−20 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 27

Embodiment 7

| f_N | [mm] | 17.33 | R4 | [mm] | −24.79 | CA2 | [mm] | 15.53 |
|---|---|---|---|---|---|---|---|---|
| f_F | [mm] | 18.61 | R5 | [mm] | 25.65 | CA3 | [mm] | 15.48 |
| f12 | [mm] | 54.17 | R6 | [mm] | −242.44 | CA5 | [mm] | 11.76 |
| f1 | [mm] | 217.10 | CT1 | [mm] | 3.20 | CA6 | [mm] | 10.68 |
| f2 | [mm] | 69.08 | CT2 | [mm] | 7.14 | TDP2 | [mm] | 0.68 |
| f3 | [mm] | 42.84 | CT3 | [mm] | 6.03 | TDP3 | [mm] | 1.77 |
| R2 | [mm] | −118.47 | T23_N | [mm] | 0.26 | TDP5 | [mm] | 3.61 |
| R3 | [mm] | −65.01 | T23_F | [mm] | 3.82 | TDP6 | [mm] | 0.25 |

TABLE 28

Embodiment 7

| f_N/f_F | 0.93 | R6/R2 | 2.05 |
|---|---|---|---|
| f12/f3 | 1.26 | R3/CT2 | −9.11 |
| R3*R5/f2[mm] | −24.14 | CT1/CT2 | 0.45 |
| f2/f3 | 1.61 | (CT1 + CT2)/CT3 | 1.72 |
| f1/f2 | 3.14 | (T23_F − T23_N)/ (f_F − f_N) | 2.80 |
| (f_N*f_F)/f12[mm] | 5.95 | CA2/TDP2 | 22.68 |
| R2/CT1 | −37.00 | CA3/TDP3 | 8.74 |
| R3/R4 | 2.62 | CA5/TDP5 | 3.26 |
| R6/R5 | −9.45 | CA6/TDP6 | 42.25 |

Eighth Embodiment

Figure 8A:
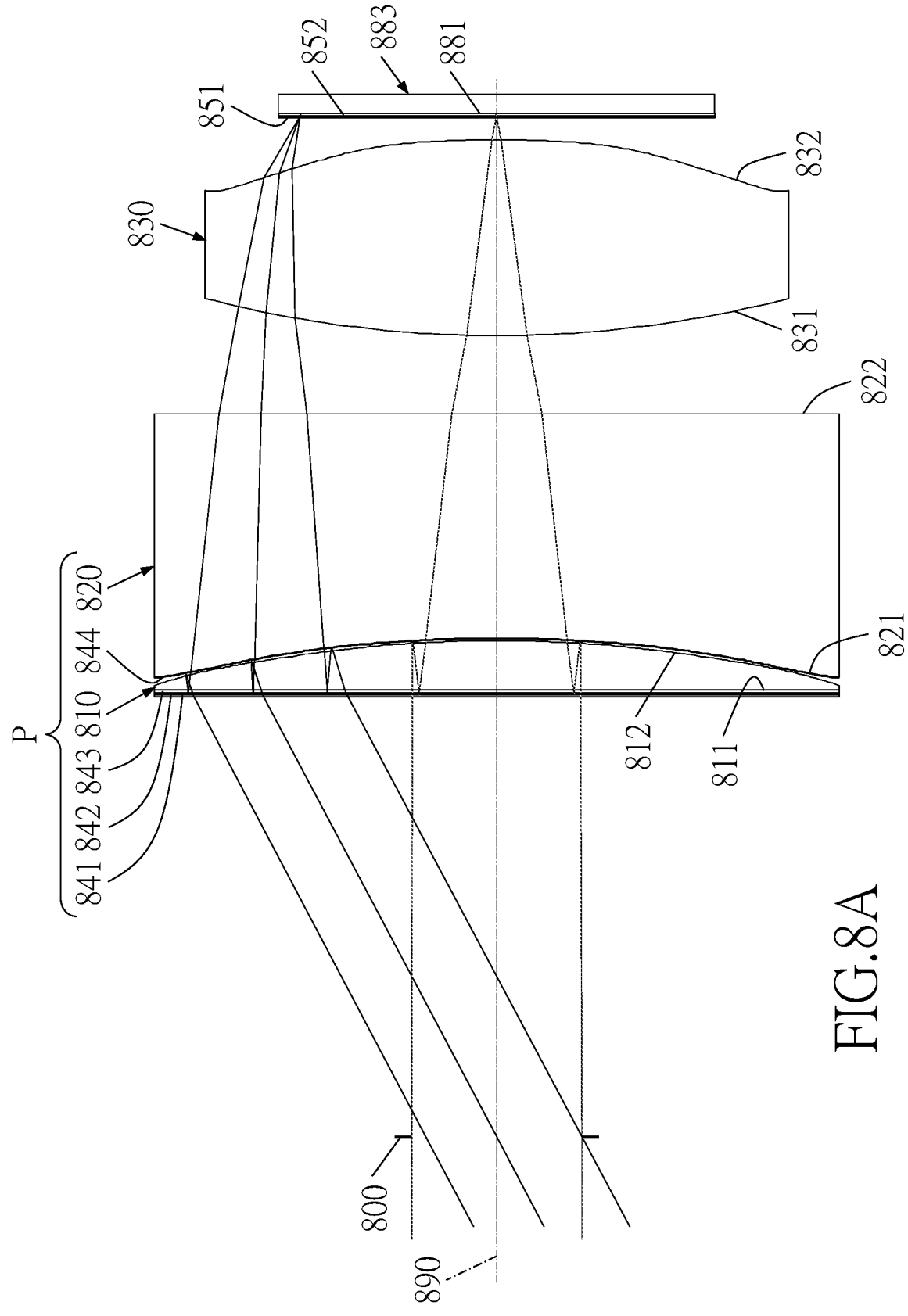
FIG. 8A is a schematic diagram of an optical lens assembly focusing on a far point in accordance with an eighth embodiment of the present invention.
Figure 8B:
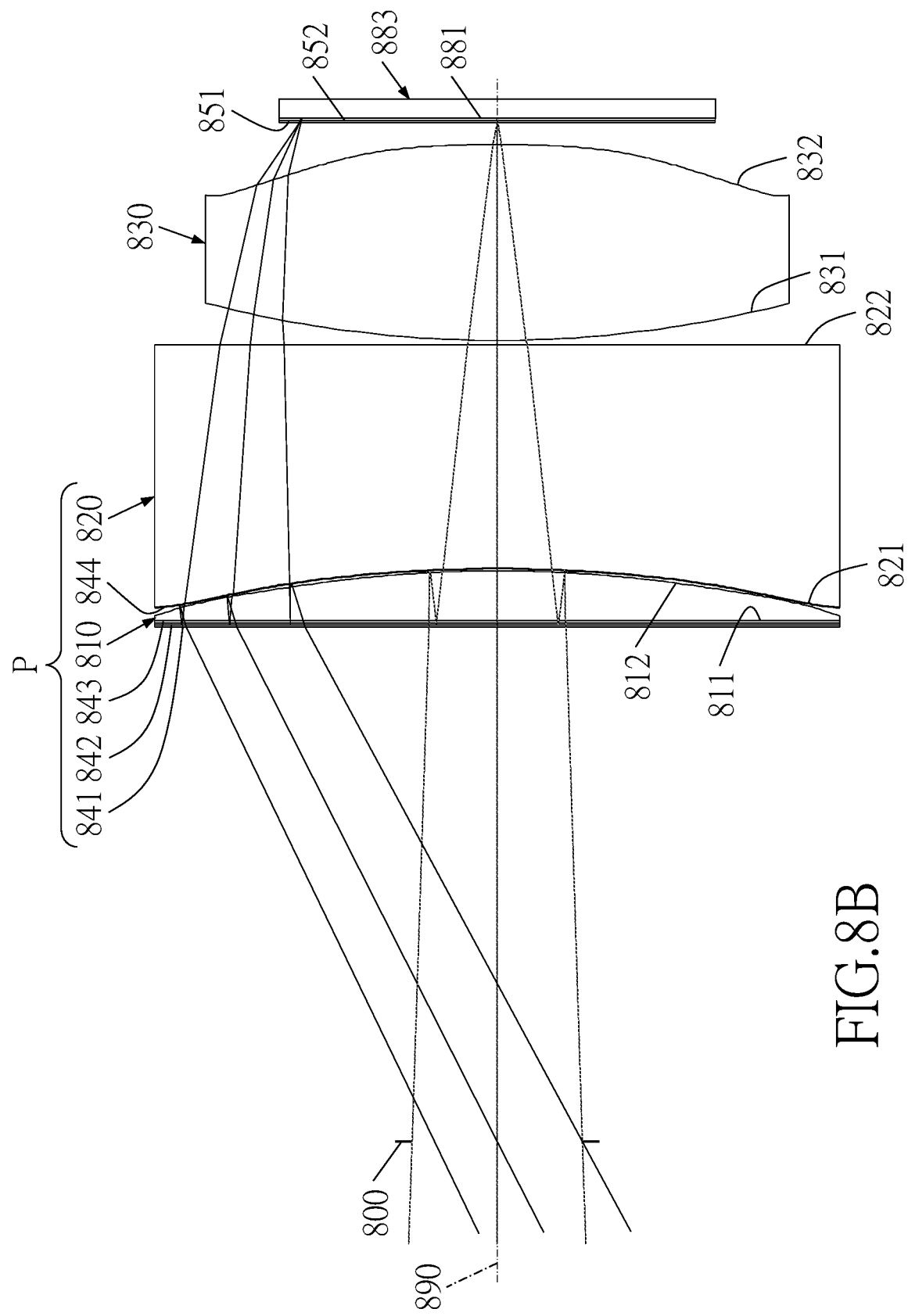
FIG. 8B is a schematic diagram of the optical lens assembly focusing on a near point in accordance with the eighth embodiment of the present invention.

Referring to FIGS. 8A and 8B, an optical lens assembly in accordance with an eighth embodiment of the present invention includes, in order from a visual side to an image source side along an optical axis 890: a stop 800, a first absorptive polarizer 841, a reflective polarizer 842, a first phase retarder 843, a first lens 810, a partial-reflective-partial-transmissive element 844, a second lens 820, a third lens 830, a second phase retarder 851, a second absorptive polarizer 852 and an image source plane 881. Wherein the first absorptive polarizer 841, the reflective polarizer 842, the first phase retarder 843, the first lens 810, the partial-reflective-partial-transmissive element 844 and the second lens 820 form an optical group P. When the focus of the optical lens assembly changes from a near point (FIG. 8B) to a far point (FIG. 8A), the optical group P moves from the image source side to the visual side. The optical lens assembly has a total of three lenses with refractive power, but not is limited thereto.

The stop 800 may be located in a position where the user's eyes view an image.

The first lens 810 with positive refractive power includes a visual-side surface 811 and an image source-side surface 812, the visual-side surface 811 of the first lens 810 is flat in a paraxial region thereof, the image source-side surface 812 of the first lens 810 is convex in a paraxial region thereof, the image source-side surface 812 of the first lens 810 is aspheric, and the first lens 810 is made of plastic.

The second lens 820 with negative refractive power includes a visual-side surface 821 and an image source-side surface 822, the visual-side surface 821 of the second lens 820 is concave in a paraxial region thereof, the image source-side surface 822 of the second lens 820 is flat in a paraxial region thereof, the visual-side surface 821 of the second lens 820 is aspheric, and the second lens 820 is made of plastic.

The third lens 830 with positive refractive power includes a visual-side surface 831 and an image source-side surface 832, the visual-side surface 831 of the third lens 830 is convex in a paraxial region thereof, the image source-side surface 832 of the third lens 830 is convex in a paraxial region thereof, the visual-side surface 831 of the third lens 830 is spherical, the image source-side surface 832 of the first lens 830 is aspheric, and the third lens 830 is made of plastic.

The configuration modes and characteristics of the first phase retarder 843, the reflective polarizer 842 and the first absorptive polarizer 841 may refer to that of the first phase retarder 143, the reflective polarizer 142 and the first absorptive polarizer 141 of the first embodiment and will not be explained again.

The partial-reflective-partial-transmissive element 844 is disposed on (for example, but not limited to, coating) the image source-side surface 822 of the second lens 820 and has an average reflectance of at least 30%, preferably 50%, in the wavelength range of visible light. The average reflectance here is an average value of different reflectance of the partial-reflective-partial-transmissive element 844 for different wavelengths. The partial-reflective-partial-transmissive element 844 is disposed between the first lens 810 and the third lens 830.

The configuration modes and characteristics of the second absorptive polarizer 852 and the second phase retarder 851 may refer to that of the second absorptive polarizer 152 and the second phase retarder 151 of the first embodiment and will not be explained again.

The optical lens assembly works in cooperation with an image source 883 disposed on the image source plane 881. In the present embodiment, the type of the image source 883 is, for example, but not limited to, an OLED display, a LED display, a liquid crystal display, or other displays.

Please refer to Tables 29-32, Table 29 shows the detailed optical data of the elements of the optical lens assembly of the eighth embodiment, Table 30 shows the data of the aspherical surfaces of the lenses of the optical lens assembly of the eighth embodiment, Table 31 shows the remaining parameters of the optical lens assembly of the eighth embodiment and the values thereof, and the values of the parameters in Tables 29 and 31 meet the conditional formulas of Table 32. In the eighth embodiment, the equation of the aspheric surface profiles of the aforementioned lenses is the same as the equation of the aspheric surface profiles of the aforementioned lenses in the first embodiment. The definitions of the surfaces in Table 29 can be referred to the relevant description of Table 1 and will not be explained again.

TABLE 29

Embodiment 8
Near point: f_N = 18.79 mm, EPD = 10.00 mm, FOV_N = 53.87°
Far point: f_F = 19.77 mm, EPD = 10.00 mm, FOV_F = 56.00°

| Surface | | Radius of curvature | Thickness/gap | | Refractive index (nd) | Abbe number (vd) | Refraction/ reflection |
|---|---|---|---|---|---|---|---|
| 0 | Stop | Infinity | Near point | 24.000 | — | — | — |
| | | | Far point | 21.000 | | | |
| 1 | First absorptive | Infinity | 0.100 | | 1.533 | 56.0 | Refraction |
| 2 | Reflective polarizer | Infinity | 0.100 | | 1.533 | 56.0 | Refraction |
| 3 | First phase retarder | Infinity | 0.100 | | 1.533 | 56.0 | Refraction |
| 4 | First lens | Infinity | 2.330 | | 1.544 | 55.9 | Refraction |
| 5 | | −60.517 | 0.100 | | — | — | Refraction |
| 6 | Partial-reflective-partial-transmissive element | −70.110 | −0.100 | | | mirror | Reflection |
| 7 | | −60.517 | −2.330 | | 1.544 | 55.9 | Refraction |
| 8 | First phase retarder | Infinity | −0.100 | | 1.533 | 56.0 | Refraction |
| 9 | Reflective polarizer | Infinity | −0.100 | | 1.533 | 56.0 | Refraction |
| 10 | Reflective polarizer | Infinity | 0.100 | | | mirror | Reflection |
| 11 | First phase retarder | Infinity | 0.100 | | 1.533 | 56.0 | Refraction |
| 12 | First lens | Infinity | 2.330 | | 1.544 | 55.9 | Refraction |
| 13 | | −60.517 | 0.100 | | | | Refraction |
| 14 | Second lens | −70.110 | 10.493 | | 1.645 | 23.4 | Refraction |
| 15 | | Infinity | Near point | 0.200 | — | — | Refraction |
| | | | Far point | 3.684 | | | |
| 16 | Third lens | 54.677 | 9.179 | | 1.544 | 55.9 | Refraction |
| 17 | | −81.828 | 1.000 | | — | — | Refraction |
| 18 | Second phase retarder | Infinity | 0.100 | | 1.533 | 56.0 | Refraction |
| 19 | Second absorptive polarizer | Infinity | 0.100 | | 1.533 | 56.0 | Refraction |
| 20 | Image source plane | Infinity | — | | — | — | — |

The reference wavelength is 555 nm.

TABLE 30

Embodiment 8
Aspheric Coefficients

| Surface | A visual-side surface of the first lens 4, 8, 12 | An image source-side of the first lens 5, 7, 13 | A visual-side surface of the second lens 6, 14 | An image source-side of the second lens 15 | A visual-side surface of the third lens 16 | An image source-side of the third lens 17 |
|---|---|---|---|---|---|---|
| K: | 0.0000E+00 | 3.3775E+00 | -7.5079E+00 | 0.0000E+00 | 0.0000E+00 | 0.0000E+00 |
| A2: | 0.0000E+00 | 0.0000E+00 | 0.0000E+00 | 0.0000E+00 | 0.0000E+00 | 0.0000E+00 |
| A4: | 0.0000E+00 | 1.7377E-06 | -2.0339E-06 | 0.0000E+00 | 0.0000E+00 | -1.7362E-04 |
| A6: | 0.0000E+00 | 3.2606E-08 | -3.1720E-08 | 0.0000E+00 | 0.0000E+00 | 7.7256E-07 |
| A8: | 0.0000E+00 | 1.4859E-10 | 1.6544E-12 | 0.0000E+00 | 0.0000E+00 | 2.9143E-09 |
| A10: | 0.0000E+00 | -8.4845E-13 | -1.3588E-13 | 0.0000E+00 | 0.0000E+00 | -1.2707E-11 |
| A12: | 0.0000E+00 | -2.2375E-15 | 2.2054E-15 | 0.0000E+00 | 0.0000E+00 | -9.1563E-14 |
| A14: | 0.0000E+00 | 2.2715E-18 | 9.8411E-18 | 0.0000E+00 | 0.0000E+00 | 1.1973E-16 |
| A16: | 0.0000E+00 | 1.7728E-20 | -3.5293E-20 | 0.0000E+00 | 0.0000E+00 | 1.3959E-18 |
| A18: | 0.0000E+00 | 0.0000E+00 | 0.0000E+00 | 0.0000E+00 | 0.0000E+00 | 0.0000E+00 |
| A20: | 0.0000E+00 | 0.0000E+00 | 0.0000E+00 | 0.0000E+00 | 0.0000E+00 | 0.0000E+00 |

TABLE 31

Embodiment 8

| | | | | | |
|---|---|---|---|---|---|
| f_N [mm] | 18.79 | R4[mm] | Infinity | CA2 [mm] | 14.93 |
| f_F [mm] | 19.77 | R5[mm] | 54.68 | CA3 [mm] | 14.93 |
| f12 [mm] | -6153.14 | R6[mm] | -81.83 | CA5 [mm] | 12.65 |
| f1 [mm] | 110.90 | CT1[mm] | 2.33 | CA6 [mm] | 11.31 |
| f2 [mm] | -108.84 | CT2[mm] | 10.49 | TDP2 [mm] | 1.74 |
| f3 [mm] | 61.53 | CT3[mm] | 9.18 | TDP3 [mm] | 1.69 |
| R2 [mm] | -60.52 | T23_N[mm] | 0.20 | TDP5 [mm] | 1.48 |
| R3 [mm] | -70.11 | T23_F[mm] | 3.68 | TDP6 [mm] | 1.90 |

TABLE 32

Embodiment 8

| | | | |
|---|---|---|---|
| f_N/f_F | 0.95 | R6/R2 | 1.35 |
| f12/f3 | -100.01 | R3/CT2 | -6.68 |
| R3*R5/f2[mm] | 35.22 | CT1/CT2 | 0.22 |
| f2/f3 | -1.77 | (CT1 + CT2)/CT3 | 1.40 |
| f1/f2 | -1.02 | (T23_F - T23_N)/ (f_F - f_N) | 3.57 |
| (f_N*f_F)/f12[mm] | -0.06 | CA2/TDP2 | 8.58 |
| R2/CT1 | -25.97 | CA3/TDP3 | 8.86 |
| R3/R4 | 0.00 | CA5/TDP5 | 8.53 |
| R6/R5 | -1.50 | CA6/TDP6 | 5.96 |

For the optical lens assembly in the present invention, the lenses can be made of plastic or glass. If the lens is made of plastic. it is conducive to reducing the manufacturing cost. If the lens is made of glass, it is conducive to enhancing the degree of freedom in the arrangement of refractive power of the optical lens assembly.

For the optical lens assembly in the present invention, the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

For the optical lens assembly in the present invention, the maximum effective radius of the lens surface is usually a radius of the effective optical region of the lens surface (i.e., a region which is not subjected to any surface treatment or extinction processing or is not provided with any shade).

Figure 9:
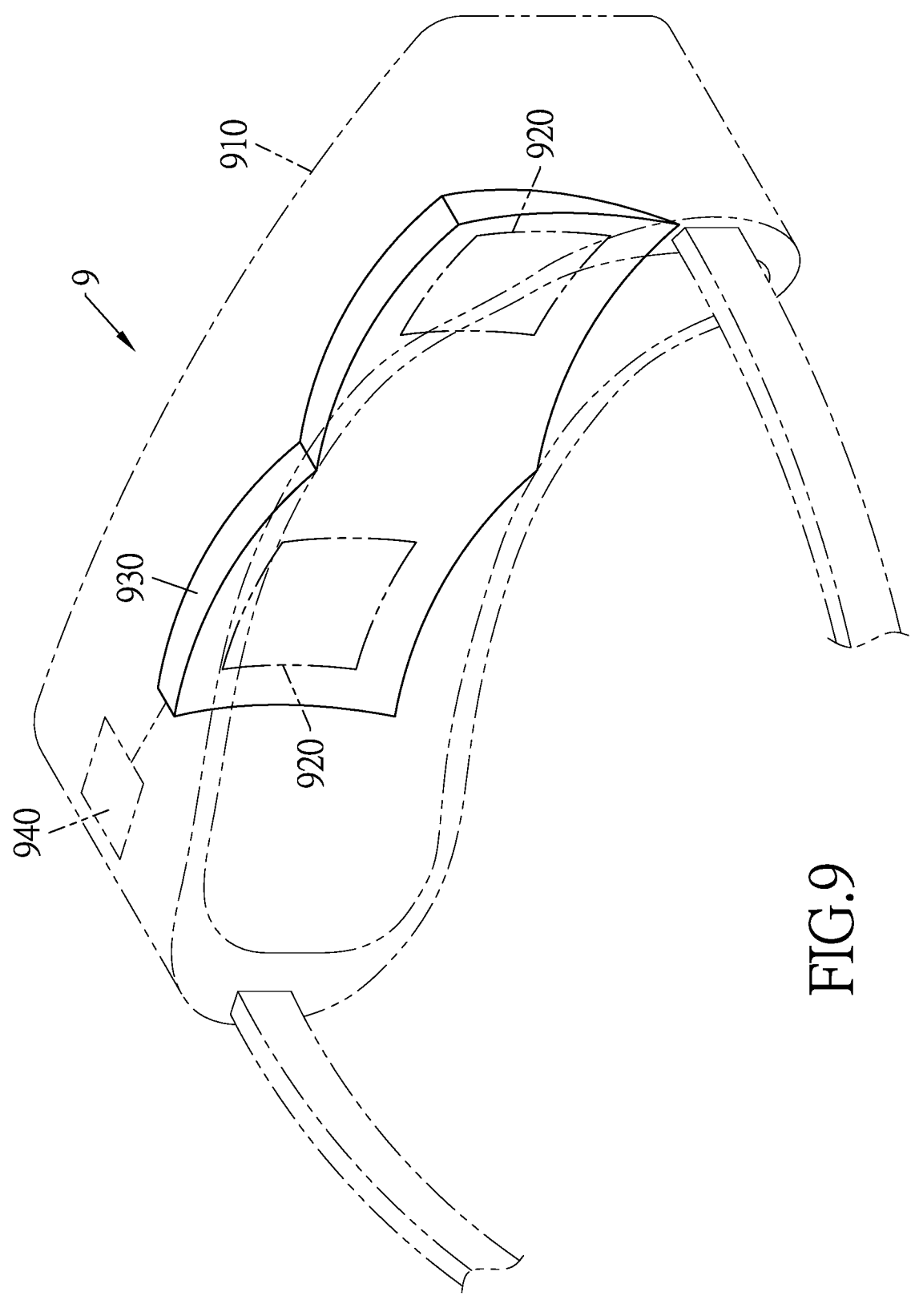
FIG. 9 is a schematic diagram of a head-mounted electronic device in accordance with an embodiment of the present invention.

The optical lens assembly of the present invention can be used in head-mounted electronic devices as required. FIG. 9 shows a head-mounted electronic device in accordance with an embodiment of the present invention. The head-mounted electronic device 9 is a head-mounted display device using, but not limited to, virtual reality (VR) technology, and includes a housing 910, an optical module 920, an image source 930 and a controller 940.

The optical module 920 corresponds to the left and right eyes of the user. The optical module 920 includes an optical lens assembly described in any one of the first to eighth embodiments.

The image source 930 can be an image source described in any one of the first to eighth embodiments. The image source 930 corresponds to the left and right eyes of the user, and the type of the image source 930 may be an OLED display, a LED display, a liquid crystal display, or other display, but is not limited thereto.

The controller 940 is electrically connected to the image source 930, so as to control the image source 930 to display an image, whereby the head-mounted electronic device 9 can project the image to the eyes of the user.

What is claimed is:

1. An optical lens assembly, comprising, in order from a visual side to an image source side:

an optical group comprising a partial-reflective-partial-transmissive element; and in order from the visual side to the image source side: an absorptive polarizer, a reflective polarizer, a phase retarder, a first lens with refractive power, a second lens with refractive power; and a third lens with refractive power;

wherein the partial-reflective-partial-transmissive element is disposed between the first lens and the third lens; at least one of the first lens and the second lens has a positive refractive power; when the focus of the optical lens assembly changes from a near point to a far point, the optical group moves from the image source side to the visual side; a focal length of the optical lens assembly focusing on the near point is f_N, a focal length of the optical lens assembly focusing on the far point is f_F, and the following condition is satisfied: 0.72<f_N/f_F<1.22.

2. The optical lens assembly as claimed in claim 1, wherein a radius of curvature of a visual-side surface of the third lens is R5, a radius of curvature of an image source-side surface of the third lens is R6, and the following condition is satisfied: −11.34<R6/R5<1.61.

3. The optical lens assembly as claimed in claim 1, wherein a radius of curvature of an image source-side surface of the first lens is R2, a radius of curvature of an image source-side surface of the third lens is R6, and the following condition is satisfied: −0.83<R6/R2<2.46.

4. The optical lens assembly as claimed in claim 1, wherein a maximum effective radius of an image source-side surface of the first lens is CA2, an absolute value of a displacement in parallel to an optical axis from an intersection between an image source-side surface of the first lens and the optical axis to the maximum effective radius position on the image source-side surface of the first lens is TDP2, and the following condition is satisfied: 4.83<CA2/TDP2<80.97.

5. The optical lens assembly as claimed in claim 1, wherein a radius of curvature of a visual-side surface of the second lens is R3, a radius of curvature of a visual-side surface of the third lens is R5, a focal length of the second lens is f2, and the following condition is satisfied: −171.97 mm<(R3*R5)/f2<144.98 mm.

6. The optical lens assembly as claimed in claim 1, wherein a focal length of the second lens is f2, a focal length of the third lens is f3, and the following condition is satisfied: −10.65<f2/f3<7.35.

7. The optical lens assembly as claimed in claim 1, wherein a maximum effective radius of a visual-side surface of the second lens is CA3, an absolute value of a displacement in parallel to an optical axis from an intersection between a visual-side surface of the second lens and the optical axis to the maximum effective radius position on the visual-side surface of the second lens is TDP3, and the following condition is satisfied: 4.06<CA3/TDP3<49.78.

8. The optical lens assembly as claimed in claim 1, wherein a focal length of the first lens is f1, a focal length of the second lens is f2, and the following condition is satisfied: −3.25<f1/f2<3.77.

9. The optical lens assembly as claimed in claim 1, wherein a radius of curvature of an image source-side surface of the first lens is R2, a thickness of the first lens along an optical axis is CT1, and the following condition is satisfied: −54.72<R2/CT1<103.11.

10. The optical lens assembly as claimed in claim 1, wherein a maximum effective radius of a visual-side surface of the third lens is CA5, an absolute value of a displacement in parallel to an optical axis from an intersection between a visual-side surface of the third lens and the optical axis to the maximum effective radius position on the visual-side surface of the third lens is TDP5, and the following condition is satisfied: 2.40<CA5/TDP5<42.28.

11. The optical lens assembly as claimed in claim 1, wherein a radius of curvature of a visual-side surface of the second lens is R3, a thickness of the second lens along an optical axis is CT2, and the following condition is satisfied: −39.56<R3/CT2<65.50.

12. The optical lens assembly as claimed in claim 1, wherein a thickness of the first lens along an optical axis is CT1, a thickness of the second lens along the optical axis is CT2, and the following condition is satisfied: 0.18<CT1/CT2<3.69.

13. The optical lens assembly as claimed in claim 1, wherein a thickness of the first lens along an optical axis is CT1, a thickness of the second lens along the optical axis is CT2, a thickness of the third lens along the optical axis is CT3, and the following condition is satisfied: 0.51<(CT1+CT2)/CT3<4.51.

14. The optical lens assembly as claimed in claim 1, wherein a distance from an image source-side surface of the second lens of the optical group to a visual-side surface of the third lens, along an optical axis when the optical lens assembly focuses on the far point is T23_F, a distance from the image source-side surface of the second lens of the optical group to the visual-side surface of the third lens, along the optical axis when the optical lens assembly focuses on the near point is T23_N, the focal length of the optical lens assembly focusing on the near point is f_N, the focal length of the optical lens assembly focusing on the far point is f_F, and the following condition is satisfied: −13.11<(T23_F−T23_N)/(f_F−f_N)<4.28.

* * * * *